(12) United States Patent
Atreya et al.

(10) Patent No.: US 9,021,072 B2
(45) Date of Patent: Apr. 28, 2015

(54) LOCALIZED MEDIA OFFLOAD

(75) Inventors: Praveen Atreya, Jersey City, NJ (US);
Kalyani Bogineni, Hillsborough, NJ (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 867 days.

(21) Appl. No.: 12/695,208

(22) Filed: Jan. 28, 2010

(65) Prior Publication Data

US 2011/0185049 A1 Jul. 28, 2011

(51) Int. Cl.
| | | |
|---|---|---|
| G06F 15/177 | (2006.01) |
| H04W 12/08 | (2009.01) |
| H04W 8/08 | (2009.01) |
| H04L 29/08 | (2006.01) |
| H04L 29/12 | (2006.01) |
| H04W 80/04 | (2009.01) |
| H04W 80/10 | (2009.01) |

(52) U.S. Cl.
CPC ......... *H04W 12/08* (2013.01); *H04L 29/12216* (2013.01); *H04L 61/2007* (2013.01); *H04W 80/04* (2013.01); *H04W 80/10* (2013.01); *H04W 8/082* (2013.01); *H04L 67/14* (2013.01)

(58) Field of Classification Search
None
See application file for complete search history.

(56) References Cited

U.S. PATENT DOCUMENTS

| 7,650,428 | B1 | 1/2010 | Taaghol et al. | |
|---|---|---|---|---|
| 7,769,881 | B2* | 8/2010 | Matsubara et al. | 709/232 |
| 8,451,800 | B2* | 5/2013 | Kovvali et al. | 370/331 |
| 8,494,529 | B2* | 7/2013 | Kim et al. | 455/438 |
| 8,588,793 | B2* | 11/2013 | Tomici et al. | 455/445 |
| 8,654,709 | B2* | 2/2014 | Centonza et al. | 370/328 |
| 8,693,367 | B2* | 4/2014 | Chowdhury et al. | 370/253 |
| 8,750,140 | B2* | 6/2014 | Bi et al. | 370/252 |
| 2004/0024912 | A1* | 2/2004 | Fukao et al. | 709/249 |
| 2004/0208153 | A1 | 10/2004 | Mizell et al. | |
| 2004/0266437 | A1 | 12/2004 | Vempati et al. | |
| 2006/0031385 | A1 | 2/2006 | Westerdal | |
| 2009/0016270 | A1 | 1/2009 | Tsirtsis et al. | |
| 2010/0011110 | A1* | 1/2010 | Doppler et al. | 709/228 |
| 2010/0035578 | A1* | 2/2010 | Ahmed | 455/411 |
| 2010/0042714 | A1* | 2/2010 | Choi et al. | 709/223 |
| 2010/0103865 | A1* | 4/2010 | Ulupinar et al. | 370/315 |

(Continued)

FOREIGN PATENT DOCUMENTS

| JP | 2003-309588 | 10/2003 |
|---|---|---|
| WO | WO-2008/110215 | 9/2008 |

(Continued)

OTHER PUBLICATIONS

"3rd Generation Partnership Project; Technical Specification Group Services and System Aspects; Local IP Access and Selected IP Traffic Offload; (Release 10)", 3GPP Standard; 3GPP TR 23.829, 3rd Generation Partnership Project (3GPP), No. V0.3.0, Dec. 9, 2009.

*Primary Examiner* — Greg C Bengzon

(57) ABSTRACT

A method includes receiving, by an Internet Protocol (IP) anchor point, a session request to a network originating from a user equipment (UE); assigning an IP address to the UE; determining whether a reverse IP address registration is permitted to a first network device, wherein the reverse IP address registration permits a media flow associated with the IP address and the UE to omit traversing the IP anchor point; and assigning an ownership of the IP address to the first network device when reverse IP address registration is permitted.

20 Claims, 18 Drawing Sheets

(56) References Cited

U.S. PATENT DOCUMENTS

| | | | |
|---|---|---|---|
| 2010/0238887 A1* | 9/2010 | Koodli et al. | 370/329 |
| 2010/0309881 A1* | 12/2010 | Kim et al. | 370/331 |
| 2011/0055572 A1* | 3/2011 | Vogt et al. | 713/171 |
| 2011/0058479 A1* | 3/2011 | Chowdhury | 370/237 |
| 2011/0081936 A1* | 4/2011 | Haim et al. | 455/522 |
| 2011/0082939 A1* | 4/2011 | Montemurro et al. | 709/227 |
| 2011/0082940 A1* | 4/2011 | Montemurro et al. | 709/227 |
| 2011/0170469 A1* | 7/2011 | Watfa et al. | 370/312 |
| 2011/0170517 A1* | 7/2011 | Bakker et al. | 370/331 |
| 2011/0171953 A1* | 7/2011 | Faccin et al. | 455/426.1 |
| 2011/0182227 A1* | 7/2011 | Rune | 370/312 |
| 2011/0216743 A1* | 9/2011 | Bachmann et al. | 370/331 |
| 2011/0225319 A1* | 9/2011 | Aso et al. | 709/238 |
| 2011/0228750 A1* | 9/2011 | Tomici et al. | 370/338 |
| 2011/0243066 A1* | 10/2011 | Nayeb Nazar et al. | 370/328 |
| 2011/0292896 A1* | 12/2011 | Yeuom et al. | 370/329 |
| 2012/0002608 A1* | 1/2012 | Vesterinen et al. | 370/328 |
| 2012/0046058 A1* | 2/2012 | Vesterinen et al. | 455/509 |
| 2012/0224536 A1* | 9/2012 | Hahn et al. | 370/328 |
| 2012/0269162 A1* | 10/2012 | Vesterinen et al. | 370/331 |
| 2013/0235845 A1* | 9/2013 | Kovvali et al. | 370/331 |
| 2013/0294413 A1* | 11/2013 | Kim et al. | 370/331 |
| 2014/0098736 A1* | 4/2014 | Centonza et al. | 370/315 |
| 2014/0105139 A1* | 4/2014 | Tomici et al. | 370/329 |

FOREIGN PATENT DOCUMENTS

| | | |
|---|---|---|
| WO | WO-2009/024182 | 2/2009 |
| WO | WO-2009/095071 | 8/2009 |
| WO | WO-2009/103340 | 8/2009 |

* cited by examiner

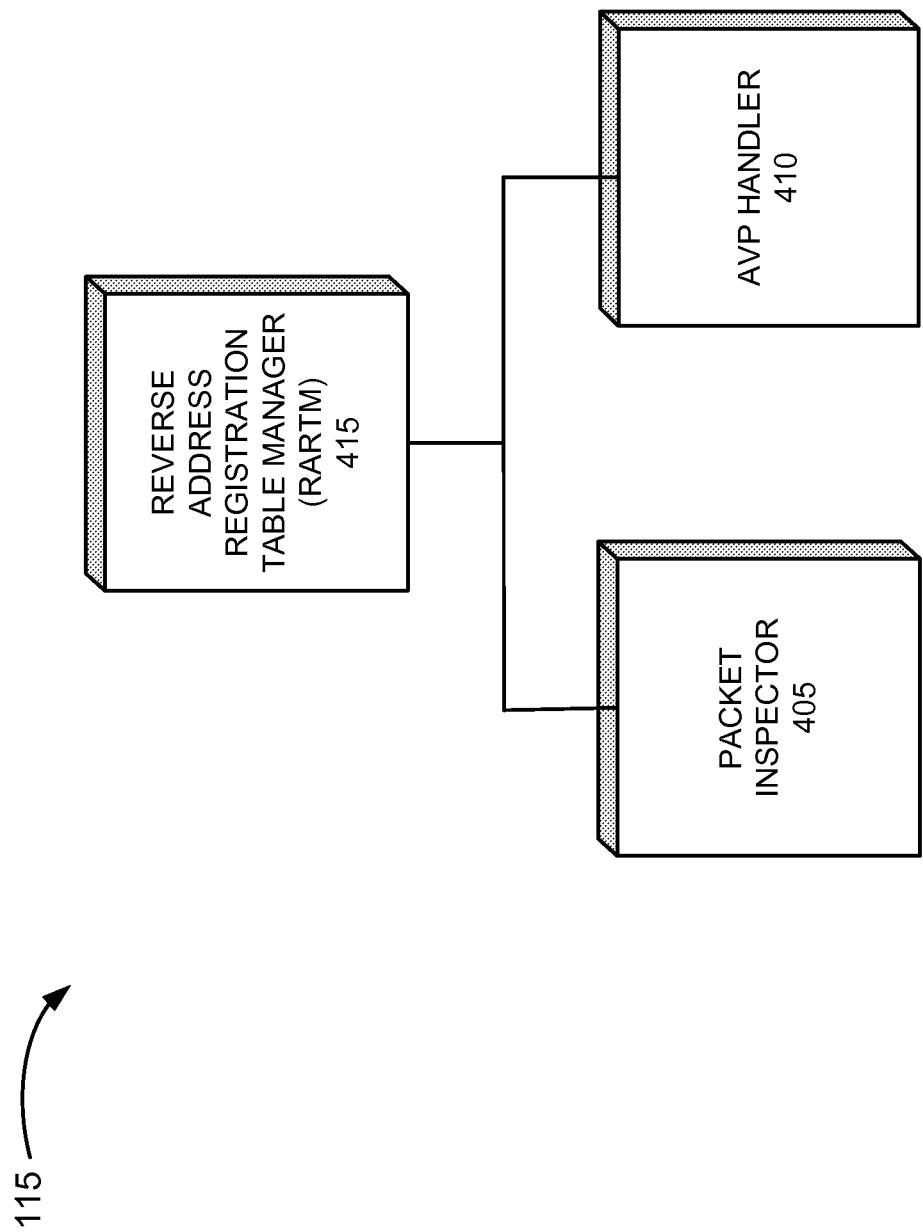

LOCALIZED MEDIA OFFLOAD

BACKGROUND

With the development of consumer devices (e.g., portable devices, stationary devices, etc.), users are afforded an expansive platform to access services and exchange information with one another. In turn, our reliance on these consumer devices and the networks that offer these services and information has comparatively grown in both personal and business settings.

As networks continue to provide an ever-expanding variety of services and assets to users, network performance metrics, such as, throughput, etc., may undoubtedly become increasingly taxed.

BRIEF DESCRIPTION OF THE DRAWINGS

FIG. 4A is a diagram illustrating exemplary functional components associated with an exemplary serving gateway (S-GW);

DETAILED DESCRIPTION OF PREFERRED EMBODIMENTS

Figure 1A:
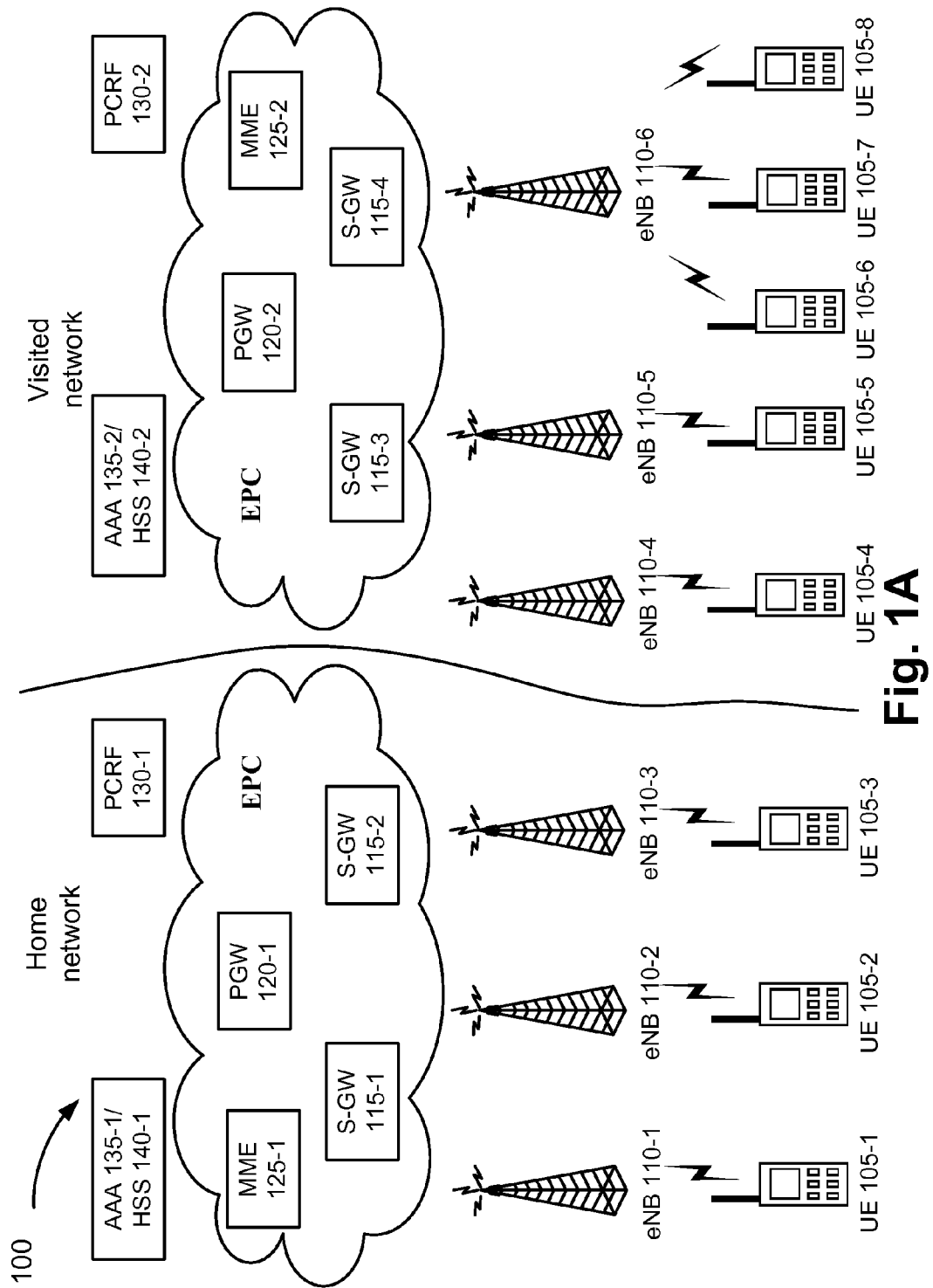
FIG. 1A is a diagram illustrating an exemplary environment in which one or more localized media offloads may be implemented.

The following detailed description refers to the accompanying drawings. The same reference numbers in different drawings may identify the same or similar elements. Also, the following detailed description does not limit the invention.

The term "localized media offload," as used herein, is to be broadly interpreted to include providing user device-to-user device media flow (i.e., not including signaling) as locally as possible with minimal usage of network resources. The term "media flow," as used herein, is to be broadly interpreted to include data that may be encapsulated by a layer three header (e.g., an Internet Protocol (IP) datagram). By way of example, but not limited thereto, within a Long Term Evolution (LTE) network, minimal usage of network resources may include providing a reverse IP address registration scheme with respect to a S-GW, an eNB, a home eNB, a user equipment-gateway (UE-GW), etc., as will be described in greater detail below. However, it will be appreciated that localized media offload may be applicable to networks other than LTE. By way of example, but not limited thereto, localized media offload may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, and/or another type of wireless network (e.g., an ad hoc network, etc.), or some other type of cellular network, non-cellular network, wired network, etc. Depending on the type of network, localized media offloading may be performed by devices not specifically described herein but yet provide corresponding functionality. By way of example, but not limited thereto, localized media offloading may be performed by a base station (BS), a base station controller (BSC), a Node-B, a network access device, a serving GPRS support node (SGSN), etc. Localized media offload may be applied per application, per user, and/or per user per media flow. Localized media offload may be applied in non-roaming scenarios and roaming scenarios. Localized media offload may be applied to IMS and/or non-Internet Protocol Multimedia Subsystem (non-IMS)-enabled services.

The term "reverse IP address registration," as used herein, is to be broadly interpreted to include a temporary relegation of user-assigned IP address ownership. By way of example, but not limited thereto, within an LTE network, the IP address ownership may involve a PGW relegating IP address ownership to an S-GW, while in other instances, the IP address ownership may involve a chain of IP address ownerships. That is, the PGW may relegate an IP address ownership to the S-GW, and in turn, the S-GW may relegate the IP address ownership to an eNB. Still further, IP address ownership may also involve a home eNB and a UE-GW. When reverse IP address registration is performed, the initiator (e.g., the master) may no longer be involved as a node in the media flow between users.

In this description, exemplary embodiments are described with reference to various protocols (e.g., the Diameter protocol, the General Packet Radio Service (GPRS) tunneling protocol (GTP), etc.). However, it should be understood that the exemplary embodiments are not dependent on employing a particular protocol. Rather, the exemplary embodiments may be implemented with other protocols (e.g., proprietary protocols, other standardized protocols, etc.) not specifically mentioned. For example, the Remote Authentication Dial In User Service (RADIUS) protocol may be used instead of the Diameter protocol, the Proxy Mobile Internet Protocol (PMIP) may be used instead of the GTP, etc.

FIG. 1A is a diagram illustrating an exemplary environment 100 in which one or more localized media offloads may be implemented. As illustrated in FIG. 1A, exemplary environment 100 may include UEs 105-1 through 105-8 (referred to generally as UE 105 or UEs 105), eNBs 110-1 through 110-6 (referred to generally as eNB 110 or eNBs 110), S-GWs 115-1 through 115-4 (referred to generally as S-GW 115 or S-GWs 115), PGWs 120-1 and 120-2 (referred to generally as PGW 120 or PGWs 120), mobility management entities (MMEs) 125-1 and 125-2 (referred to generally as MME 125 or MMEs 125), policy and charging rules function (PCRF) devices 130-1 and 130-2 (referred to generally as PCRF devices 130 or PCRF device 130), and authentication, authorization, and accounting (AAA) servers 135-1 and 135-2/home subscriber servers (HSSs) 140-1 and 140-2 (referred to generally as AAAs 135/HSSs 140 or AAA 135/HSS 140).

The number of devices and configuration in environment 100 is exemplary and provided for simplicity. In practice, environment 100 may include more devices, fewer devices, different devices, and/or differently arranged devices than those illustrated in FIG. 1A. For example, environment 100 may additionally include a relay node, a repeater, a UE-GW, a home eNB, a home eNB-GW, a security gateway (SecGW), etc. Additionally, or alternatively, environment 100 may include additional networks and/or different networks than those illustrated in FIG. 1A. Also, some functions described as being performed by a particular device may be performed by a different device or a combination of devices. Additionally, or alternatively, although FIG. 1A illustrates separate instances of MME 125, PGW 120, S-GW 115, etc., in other implementations, two or more of these devices may be combined. For example, MME 125 may be combined with S-GW 115, or PGW 120 may be combined with S-GW 115, PCRF device 130 may be combined with PGW 120, etc. Environment 100 may include wired and/or wireless connections among the devices illustrated.

UE 105 may include a device having the capability to communicate with other devices, systems, networks, and/or the like. For example, UE 105 may include a wireless telephone, an IP telephone, a computer (e.g., a laptop, a palmtop, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, and/or vehicle-based device. UE 105 may operate according to one or more versions of the LTE communication standard.

ENB 110, S-GW 115, PGW 120, and MME 125 may include network devices or entities that operate according to one or more versions of the LTE communication standard. Additionally, eNB 110, S-GW 115, PGW 120, and MME 125 may perform functions associated with localized media offload, in addition to those provided by the LTE communication standard, as will be described below. According to an exemplary implementation of the LTE communication standard, S-GW 115, PGW 120, and MME 125 may form an Evolved Packet Core (EPC) network.

PCRF device 130 may include a device that may manage bandwidth, charging rates, and policies. AAA server 135 may include a device that may provide authentication, authorization, and accounting services. HSS 140 may include a device that may provide subscriber data storage for subscription-related information (e.g., subscriber profiles, etc.). HSS 140 may also provide other services (e.g., authentication, authorization, etc.).

According to LTE communication standards, IP address allocation and registration for UEs 105 is carried out at PGWs 120. However, such an approach may result in significant inefficiencies with respect to a media flow between UEs 105. For example, media exchanged between UEs 105 must propagate via various devices and/or entities of the EPC even when the source UE 105 and the destination UE 105 may reside geographically proximate to one another (i.e., in a same network sector or sub-sector). For example, the source UE 105 and the destination UE 105 may be attached to the same S-GW 115, but different eNBs 110, or attached to the same eNB 110. Consequently, significant efficiencies may be gained by extending IP address registration beyond PGWs 120. For example, according to the exemplary embodiments described herein, IP address registration for UEs 105 may be extended to S-GWs 115, eNBs 110, home eNBs, etc. That is, IP address registration may be pushed further toward the network edge so that media flows passing to and from UEs 105 within a common network sector or sub-sector need not traverse higher layers of the LTE network. As a result, higher layer network devices may be alleviated from congestion, may utilize less resources, may have more time and resources to convey inter-sector and inter-network traffic, etc. Additionally, communication between UEs 105 may involve fewer hops, improve end-to-end latency, etc.

Localized media offloads may be implemented based on a reverse IP address registration scheme. The localized media offloads may take place without disrupting existing LTE network address allocation and registration schemes. That is, the PGW-centered allocation and registration framework may be kept intact. However, in an exemplary implementation, localized media offloads from the PGW-centered allocation and registration framework may take place by building and maintaining IP address tables at S-GWs 115, eNBs 110, home eNBs, etc., to provide a media flow between UEs 105 without passing up to the higher network layers. As described, for example, once users have been authenticated and/or registered at S-GW 115 or eNB 110, S-GW 115 or eNB 110 may perform shallow packet inspection to identify candidate packets for localized media offload based on the IP address registration tables.

Figure 1B:
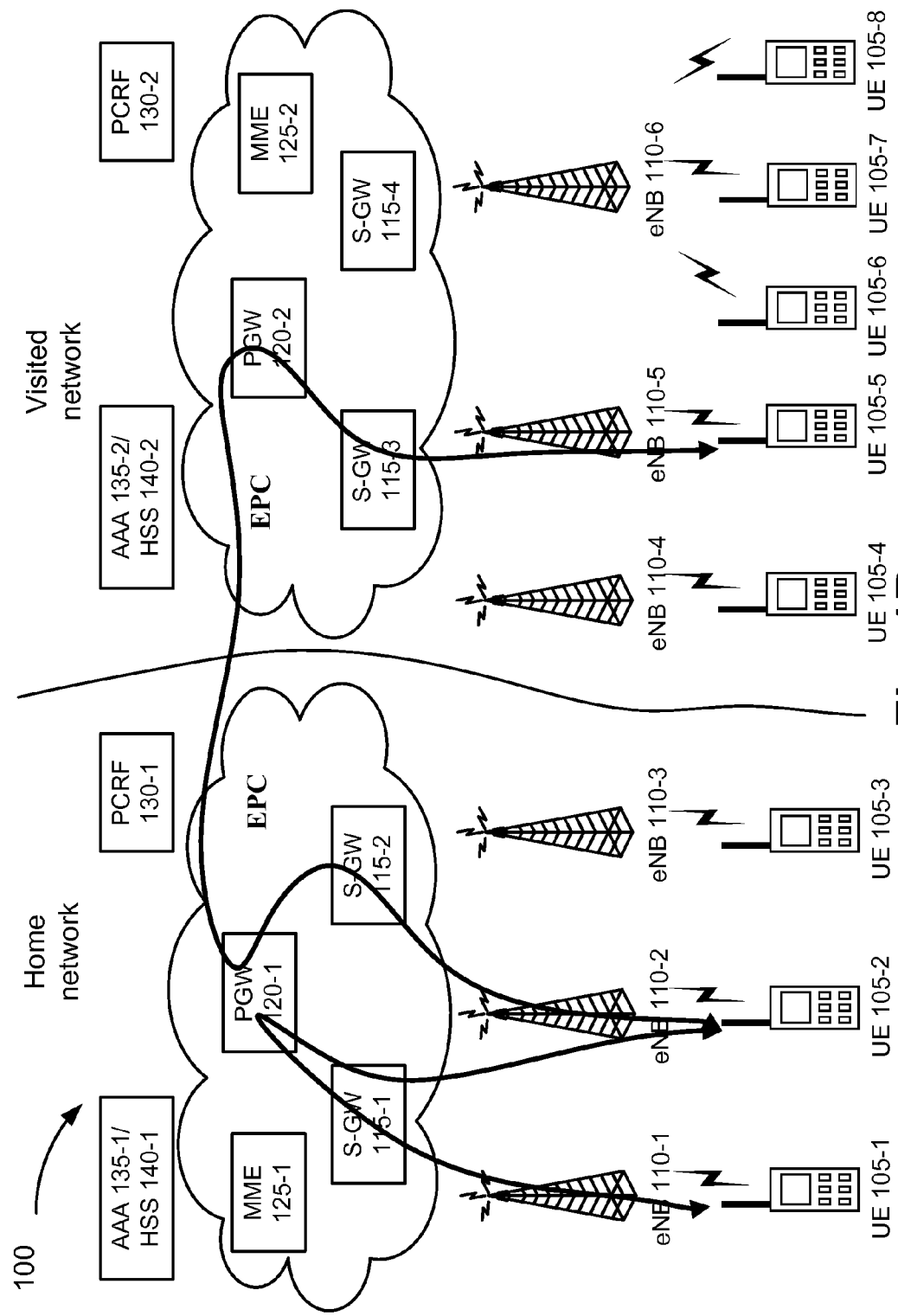
FIG. 1B is a diagram illustrating normal communication paths between user equipments.

In instances when UEs 105 are attached to different PGWs 120, normal communication (i.e., signaling and media flows) may proceed over the EPCs, as defined in the LTE communication standard. For example, as illustrated in FIG. 1B, UEs 105-2 and 105-5 may communicate within different operator networks in which the media flow may traverse PGWs 120 (i.e., PGW 120-1 and PGW 120-2). As further illustrated in FIG. 1B, when UEs 105-1 and 105-2 communicate within the same operator network, the media flow may traverse PGW 120-1.

Figure 1C:
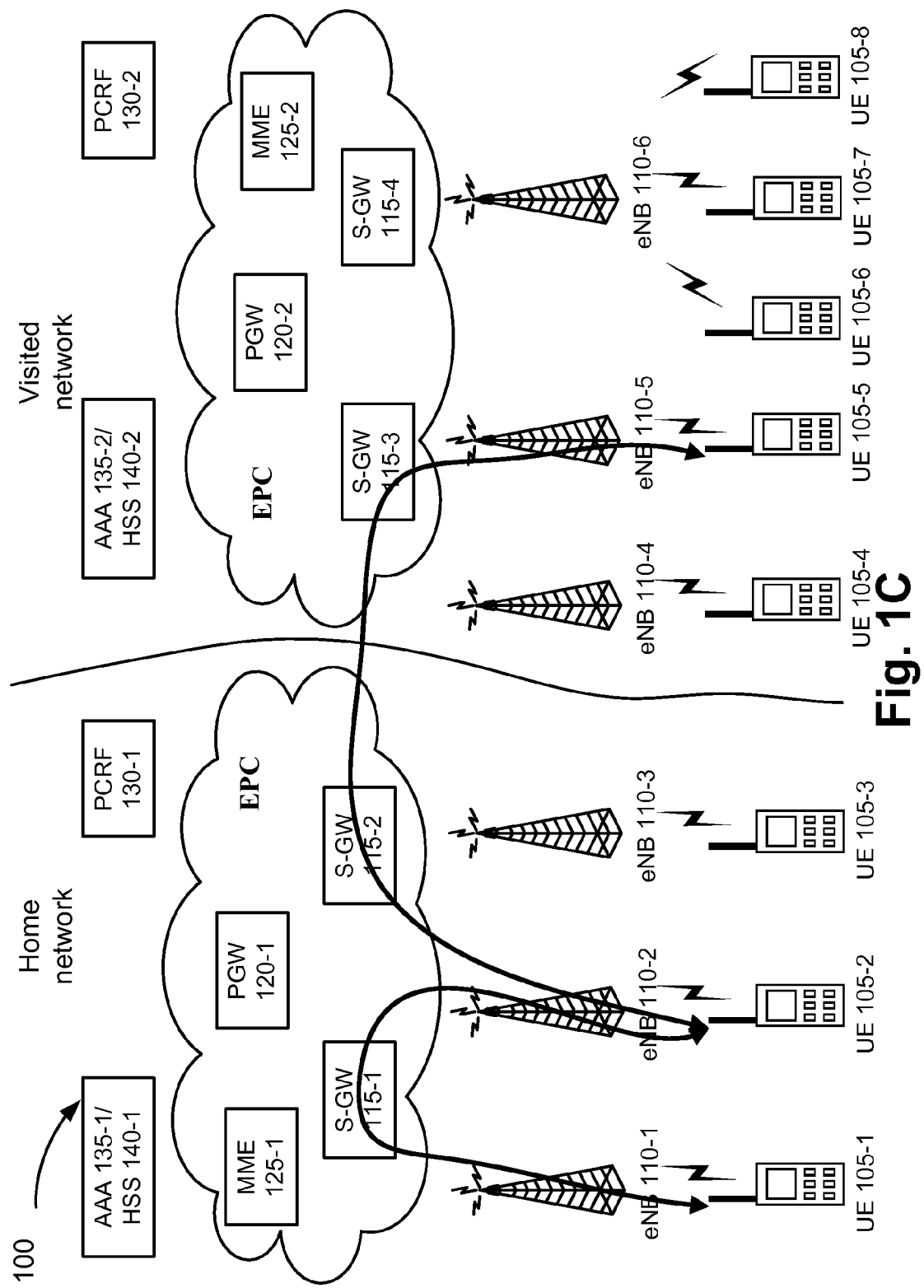
FIGS. 1C and 1D are diagrams illustrating exemplary communication paths during localized media offload.
Figure 1D:
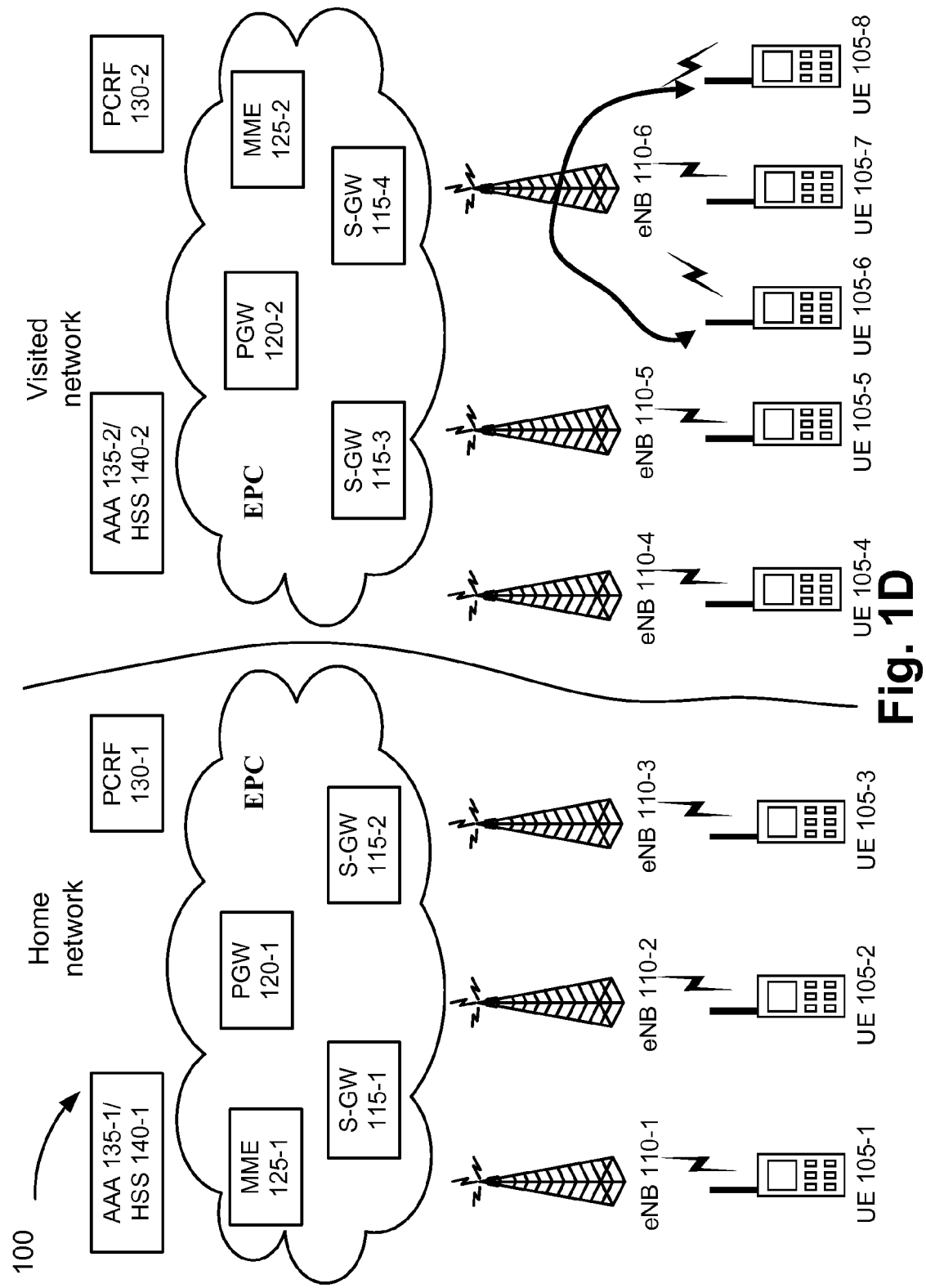

In contrast to FIG. 1B, in an exemplary implementation when utilizing localized media offload, media flow may not traverse PGW 120. For example, as illustrated in FIG. 1C, UEs 105-2 and 105-5 may communicate within different operator networks in which the media flow may not traverse PGWs 120 (i.e., PGW 120-1 and PGW 120-2). As further illustrated in FIG. 1C, when UEs 105-1 and 105-2 communicate within the same operator network, media flow may not traverse PGW 120-1. Additionally, in an exemplary implementation when UEs may be attached to the same eNB 110, media flow may not traverse S-GW 115 and PGW 120. For example, as illustrated in FIG. 1D, when localized media offload is utilized, UEs 105-6 and 105-8 may communicate within the same operator network in which the media flow may not traverse S-GW 115-4 and PGW 120-2.

Since exemplary embodiments have been broadly described, a more detailed description is provided below.

Figure 2:
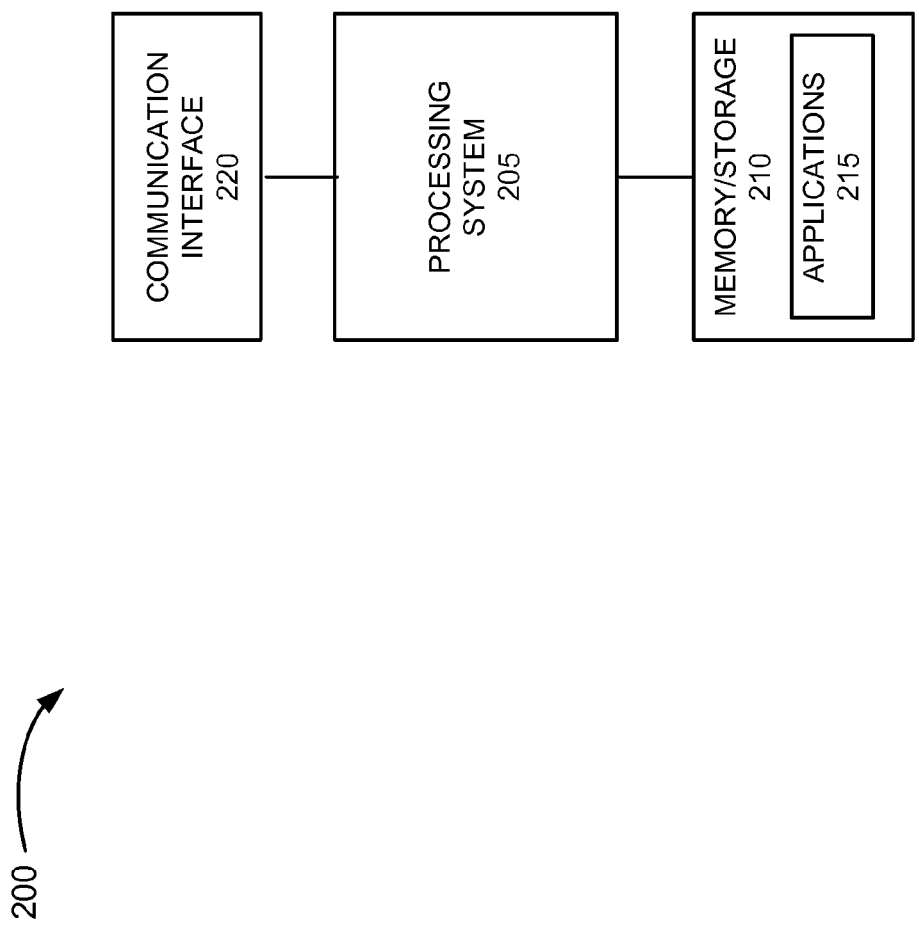
FIG. 2 is a diagram illustrating exemplary components of a device that may correspond to one or more of the devices in the exemplary environment.

FIG. 2 is a diagram illustrating exemplary components of a device 200 that may correspond to one or more of the devices in environment 100. For example, device 200 may correspond to PGW 120, S-GW 115, eNB 110, as well as other devices (e.g., MME 125, PCRF device 130, AAA server 135, UE 105, etc.), depicted in FIGS. 1A-1D. As illustrated, device 200 may include a processing system 205, memory/storage 210 including applications 215, and a communication interface 220. In other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215). Processing system 205 may perform various communication-related processing, such as, for example, modulation, demodulation, error detection, multiplexing, de-multiplexing, filtering, coding, de-coding, etc.

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. For example, with reference to PGW 120, S-GW 115, and eNB 110, applications 215 may include one or more applications for providing localized media offload.

Communication interface 220 may permit device 200 to communicate with other devices, networks, systems and/or the like. Communication interface 220 may include a wireless interface and/or wired interface. Communication interface 220 may include interfaces according to LTE communication standards.

As described herein, device 200 may perform operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 3A:
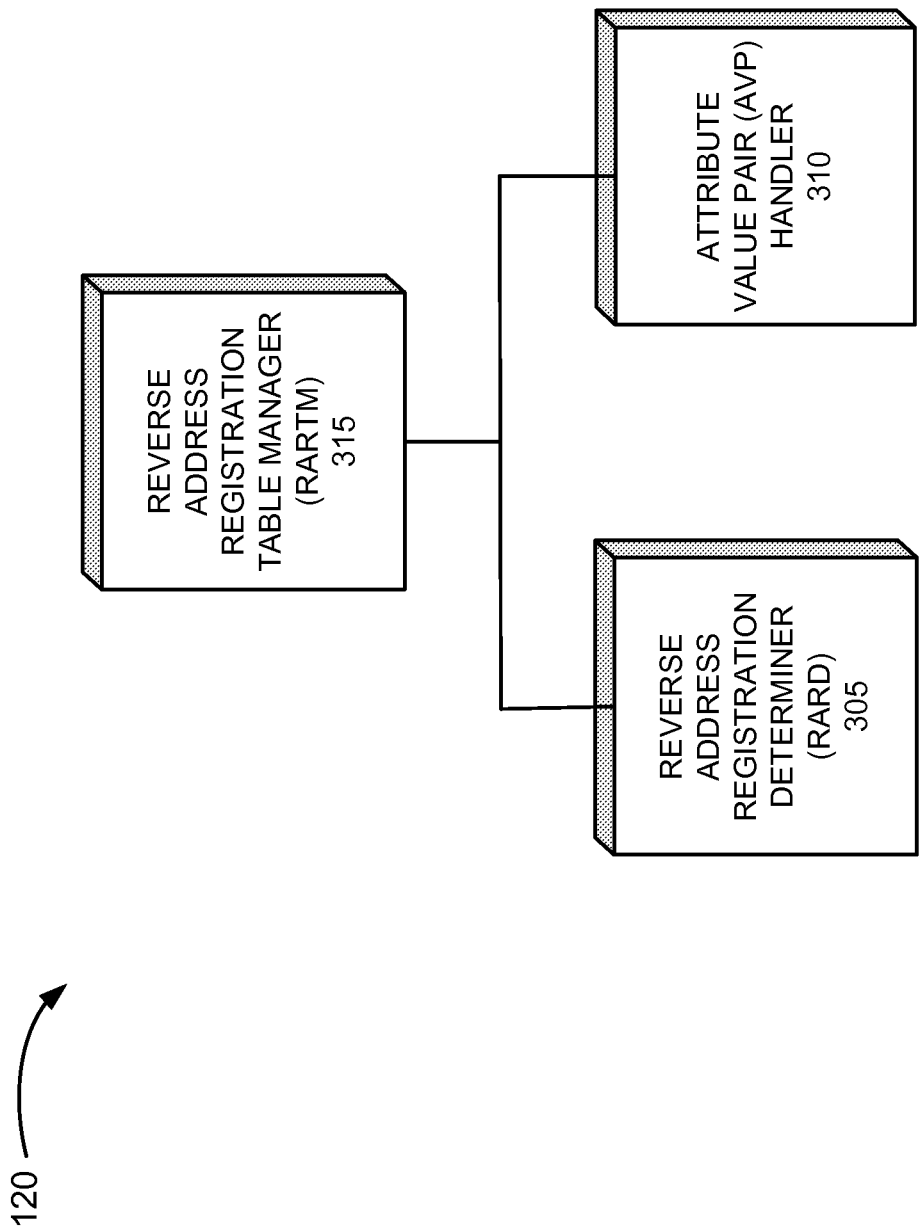
FIG. 3A is a diagram illustrating exemplary functional components associated with an exemplary a packet data network (PDN) gateway (PGW)
Figure 3B:
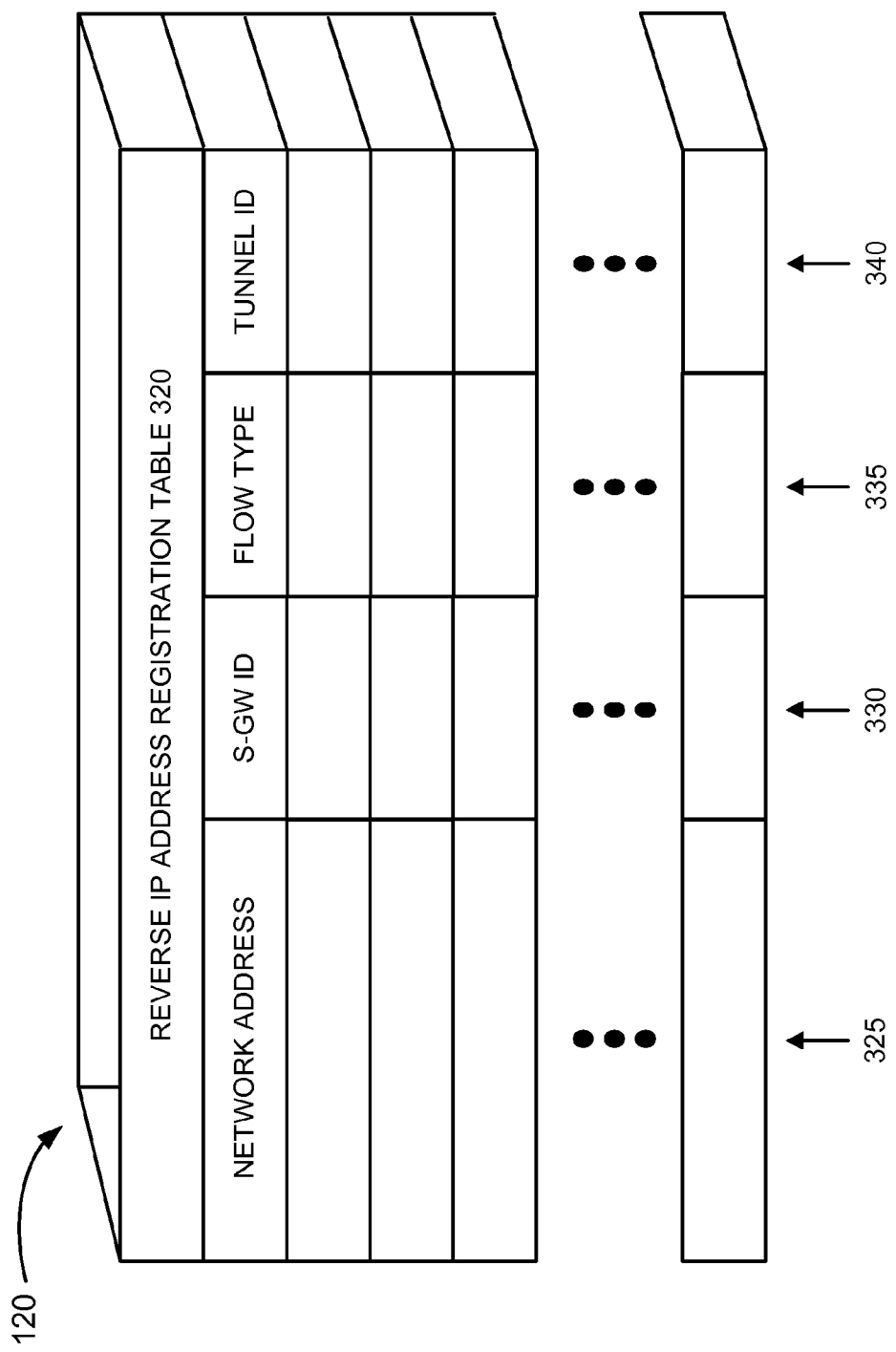
FIG. 3B is a diagram illustrating an exemplary reverse Internet Protocol (IP) address registration table in the PGW.

As previously described, PGW 120 may operate according to one or more versions of the LTE communication standard. In addition, PGW 120 may perform functions associated with localized media offload. FIGS. 3A and 3B are diagrams illustrating exemplary components associated with PGW 120 to perform localized media offload.

FIG. 3A is a diagram illustrating exemplary functional components associated with an exemplary implementation of PGW 120. As illustrated, PGW 120 may include a reverse address registration determiner (RARD) 305, an attribute value pair (AVP) handler 310, and a reverse address registration table manager (RARTM) 315. RARD 305, AVP handler 310, and/or RARTTM 315 may be implemented as a combination of hardware (e.g., processing system 205, etc.) and software (e.g., applications 215, etc.) based on the components illustrated and described with respect to FIG. 2. Alternatively, RARD 305, AVP handler 310, and/or RARTTM 315 may be implemented as hardware based on the components illustrated and described with respect to FIG. 2. It will be appreciated that other devices in environment 100 may include one or more of these functional components.

RARD 305 may determine whether localized media offload is permitted for a particular media flow. In an exemplary implementation, RARD 305 may determine whether localized media offload is permitted based on one or more packets received from S-GW 115, one or more packets received from an authorization device, an authentication device, and/or an accounting device (e.g., AAA server 135, HSS 140, or the like), and/or one or more packets received from a policy-based device (e.g., PCRF device 130 or the like). There may be various instances (e.g., during connection/session establishment and/or setup, attachment, etc.) when RARD 305 may determine whether localized media offload is permitted. When RARD 305 determines that localized media offload is permitted, PGW 120 may initiate reverse IP address registration.

AVP handler 310 may insert, extract, and interpret an AVP with respect to a packet. In an exemplary implementation of one or more embodiments described, AVPs may be utilized to coordinate localized media offload. For example, existing types of LTE packets may include AVPs to provide information to network devices to coordinate localized media offload. Additionally, the utilization of AVPs may reduce out-of-band control messaging. In other exemplary implementations, new types of (LTE) messaging, which may not utilize AVPs, may be utilized to coordinate localized media offload.

RARTM 315 may generate and manage a reverse IP address registration table. The reverse IP address registration table may include information relating to reverse IP address registration. An example of a reverse IP address registration table is described in greater detail below with respect to FIG. 3B.

Although FIG. 3A illustrates exemplary functional components of PGW 120, in other implementations, PGW 120 may include fewer functional components, additional functional components, different functional components, and/or a different arrangement of functional components than those illustrated in FIG. 3A and described. Additionally, or alternatively, one or more operations described as being performed by a particular functional component may be performed by one or more other functional components, in addition to or instead of the particular functional component.

FIG. 3B is a diagram illustrating an exemplary reverse IP address registration table 320. As illustrated, reverse IP address registration table 320 may include a network address field 325, a S-GW identifier (ID) field 330, a flow type field 335, and a tunnel identifier (ID) field 340.

Network address field 325 may indicate an IP address (e.g., IPv4 or IPv6) that has been allocated to UE 105. For example, PGW 120 may assign the IP address to UE 105 during attachment to the LTE network or when a new connection is requested.

S-GW ID field 330 may indicate an identifier associated with S-GW 115 that is utilizing localized media offload.

Flow type field 335 may indicate a type of media flow relative to a localized media offload. For example, localized media offload may be limited to only certain media flows (e.g., mobile-to-mobile flows, specific peer-to-peer (P2P) protocol mobile-to-mobile flows, etc.) based on policy settings, subscription settings, etc.

Tunnel ID field 340 may indicate a tunnel ID (e.g., a GTP-User (GTP-U) tunnel ID) and wrapper information (e.g., appropriate GTP packet header information) between PGW 120 and S-GW 115.

Although FIG. 3B illustrates an exemplary reverse IP address registration table 320, in other implementations, reverse IP address registration table 320 may include additional fields, different fields, and/or fewer fields than those illustrated in FIG. 3B and described. For example, reverse IP address registration table 320 may include a time field (not illustrated) that may indicate a duration or a lifetime associated with localized media offload. Additionally, or alternatively, reverse IP address registration table 320 may include other types of fields that relate to localized media offload (e.g., fields relating to further restrictions, billing, charging, etc.).

Figure 4B:
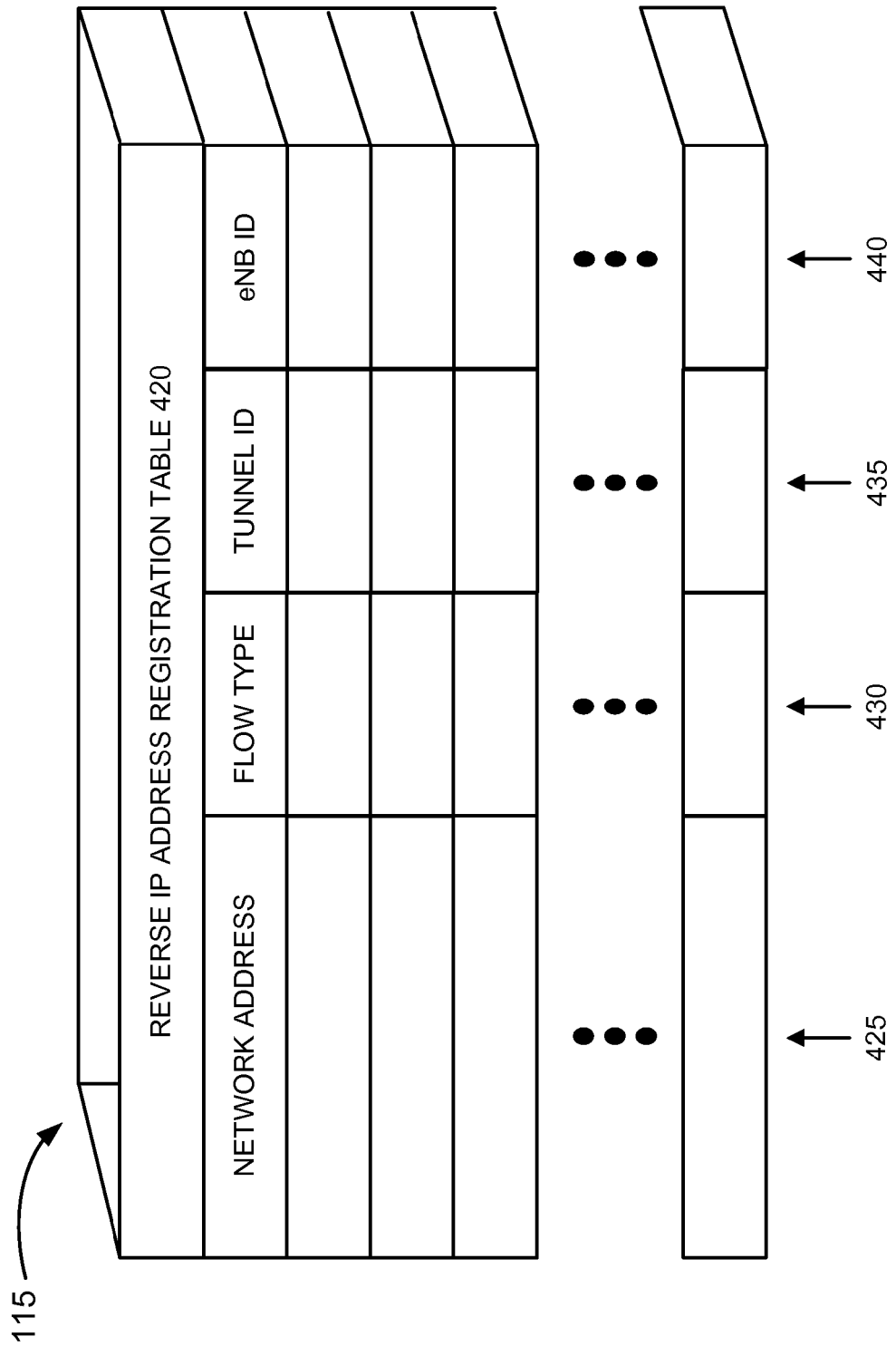
FIG. 4B is a diagram illustrating an exemplary reverse IP address registration table in the S-GW.

As previously described, S-GW 115 may operate according to one or more versions of the LTE communication standard. In addition, S-GW 115 may perform functions associated with localized media offload. FIGS. 4A and 4B are diagrams illustrating exemplary components associated with S-GW 115 to perform localized media offload.

FIG. 4A is a diagram illustrating exemplary functional components associated with an exemplary implementation of S-GW 115. As illustrated, S-GW 115 may include a packet inspector 405, an AVP handler 410, and a RARTM 415. Packet inspector 405, AVP handler 410, and/or RARTM 415 may be implemented as a combination of hardware (e.g., processing system 205, etc.) and software (e.g., applications 215, etc.) based on the components illustrated and described with respect to FIG. 2. Alternatively, packet inspector 405, AVP handler 410, and/or RARTM 415 may be implemented as hardware based on the components illustrated and described with respect to FIG. 2. It will be appreciated that other devices in environment 100 may include one or more of these functional components.

Packet inspector 405 may inspect packets to determine whether packets should be sent to PGW 120 or sent according to localized media offload. In an exemplary implementation, packet inspector 405 may determine whether source and/or destination IP addresses associated with packets received match entries in the reverse IP address registration table. If there is a match, S-GW 115 may perform local offload associated with the media flow. If there is not a match, S-GW 115 may pass the media flow to PGW 120.

AVP handler 410 may insert, extract, and interpret an AVP with respect to a packet. In an exemplary implementation of one or more embodiments described, AVPs may be utilized to coordinate localized media offload. For example, existing types of LTE packets may include AVPs to provide information to network devices to coordinate localized media offload.

Additionally, the utilization of AVPs may reduce out-of-band control messaging. In other exemplary implementations, new types of (LTE) messaging, which may not utilize AVPs, may be utilized to coordinate localized media offload.

RARTM 415 may generate and manage a reverse IP address registration table. The reverse IP address registration table may include information relating to reverse IP address registration. An example of a reverse IP address registration table is described in greater detail below in FIG. 4B.

FIG. 4B is a diagram illustrating an exemplary reverse IP address registration table 420. As illustrated, reverse IP address registration table 420 may include a network address field 425, a flow type field 430, a tunnel identifier (ID) field 435, and an eNB identifier field 440.

Network address field 425 may indicate an IP address (e.g., IPv4 or IPv6) that has been allocated to UE 105. In other words, S-GW 115 may store the IP address that was reverse registered from PGW 120.

Flow type field 430 may indicate a type of media flow relative to a localized media offload. For example, localized media offload may be limited to only certain flows (e.g., mobile-to-mobile flows, specific peer-to-peer (P2P) protocol mobile-to-mobile flows, etc.) based on policy settings, subscription settings, etc.

Tunnel ID field 435 may indicate a tunnel ID (e.g., a GTP-U tunnel ID) and wrapper information (e.g., appropriate GTP packet header information) between PGW 120 and S-GW 115. For example, the GTP-U tunnel ID may include an eNB-SGW GTP tunnel Fully Qualified Tunnel End Point Identifier (FTEID) associated with a reverse registered IP address. In such an implementation, the IP packet may arrive at the appropriate destination eNB 110 and arrive at the appropriate UE 105.

ENB ID field 440 may indicate an identifier associated with eNB 110. For example, in instances that an IP address is reverse registered to eNB 110, in which localized media offload may take place (e.g., as illustrated in FIG. 1D), S-GW 115 may identify the appropriate eNB 110 (e.g., in case of revocation, etc.). In this regard, eNB ID field 440 may be omitted when localized media offload does not take place to eNB 110.

Although FIG. 4B illustrates an exemplary reverse IP address registration table 420, in other implementations, reverse IP address registration table 420 may include additional fields, fewer fields, and/or different fields than those illustrated in FIG. 4B and described. For example, reverse IP address registration table 420 may include a time field (not illustrated) that may indicate a duration or a lifetime associated with localized media offload. Additionally, or alternatively, reverse IP address registration table 420 may include other types of fields that relate to localized media offload (e.g., fields relating to further restrictions, billing, charging, etc.).

Additionally, reverse IP address registration table 420 may reside in other devices in environment 100. For example, an eNB, a home eNB, or a UE-GW may include reverse IP address registration table 420 when an IP address is reverse registered to these devices.

Figure 5A:
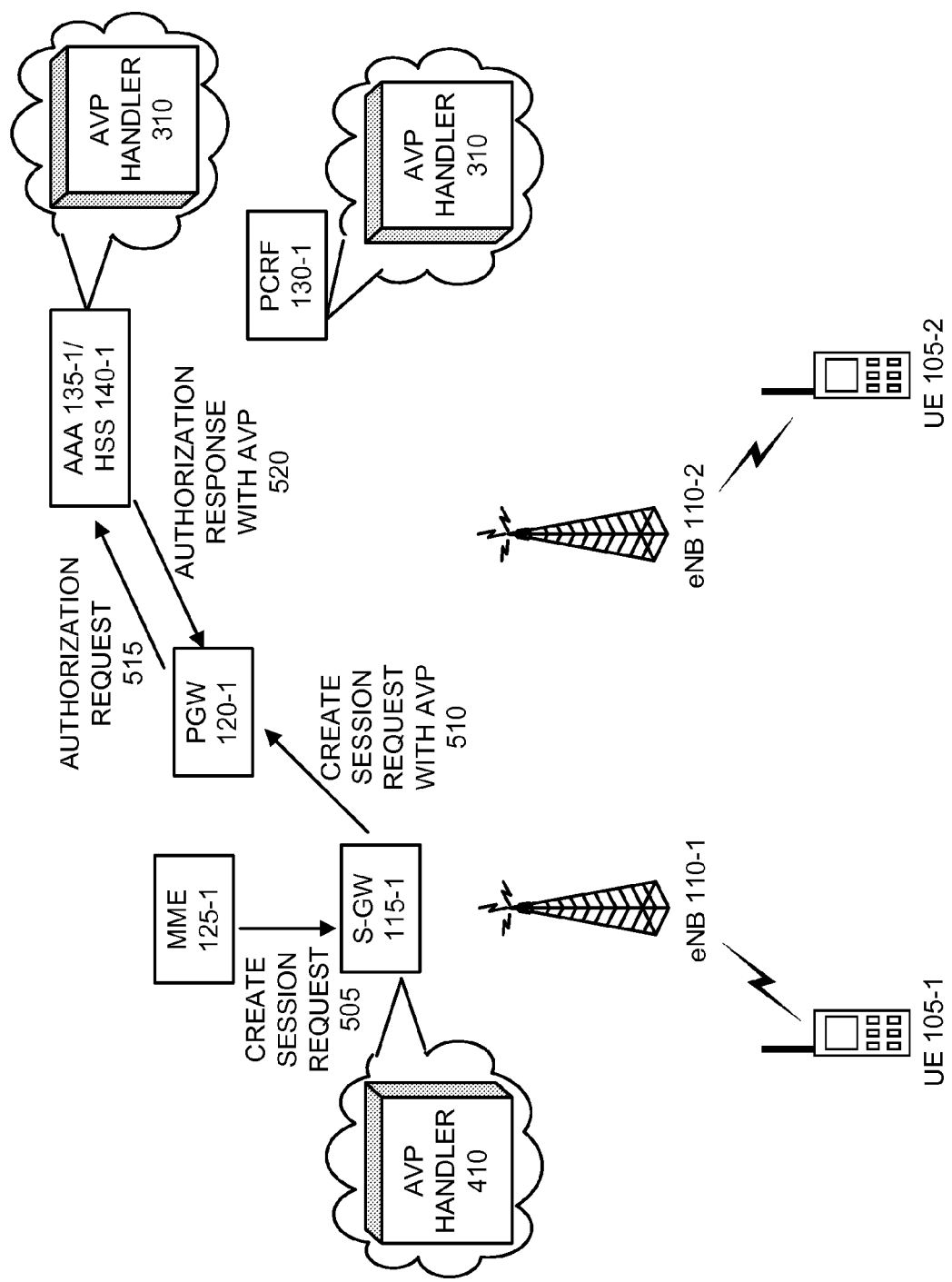
FIGS. 5A and 5B are diagrams illustrating exemplary messaging that may occur in the exemplary environment when setting up reverse IP address registration with an S-GW.
Figure 5B:
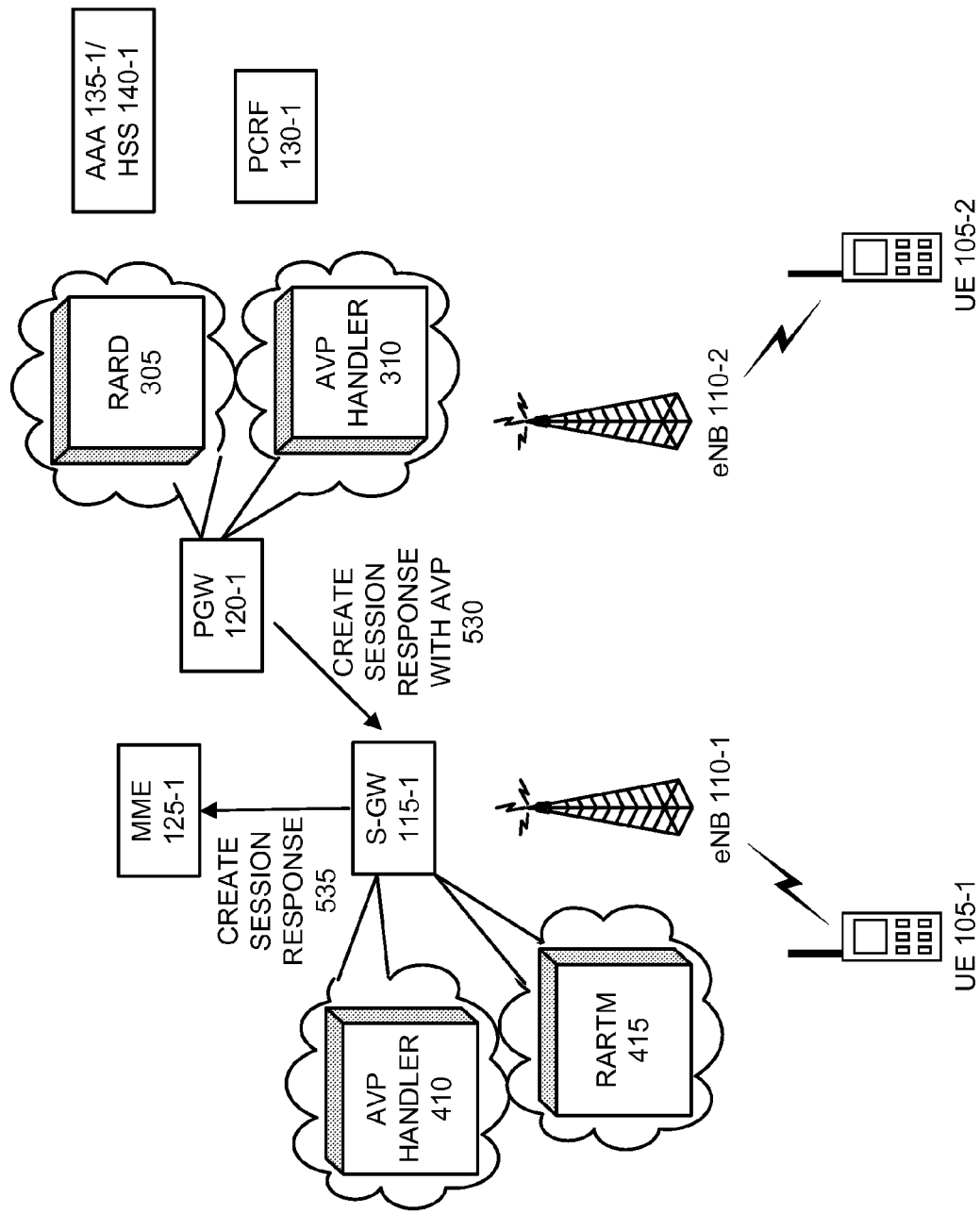

FIGS. 5A and 5B are diagrams illustrating exemplary messaging that may occur in environment 100 when setting up reverse IP address registration with S-GW 115. The processes described correspond to an exemplary embodiment in which implicit reverse IP address registration may be implemented. That is, the embodiment provides that AVPs may be added to existing types of LTE packets to provide reverse IP address registration. As previously described, in other embodiments, explicit reverse IP address registration may be implemented.

That is, new LTE packets may be utilized to achieve a similar result. However, in such embodiments, additional overhead (e.g., additional out-of-band control messaging, etc.), resource utilization, etc., may result.

Referring to FIG. 5A, assume UE 105-1 attaches to the exemplary LTE network of environment 100. MME 125-1 may authenticate a user, associated with UE 105-1, with AAA server 135-1/HSS 140-1. Assuming authentication is successful, MME 125-1 may select S-GW 115-1 and a PGW 120-1 for the user's PDN connection. In other instances, UE 105-1 may already be attached to the LTE network and may be submitting a new IP (PDN) connectivity request.

As illustrated in FIG. 5A, MME 125-1 may send a create session request 505 to S-GW 115-1. S-GW 115-1 may relay create session request 505 to PGW 120-1, except that AVP handler 410 of S-GW 115-1 may insert an AVP to indicate that S-GW 115-1 is capable of accepting reverse IP address registration. S-GW 115-1 may send a create session request with AVP 510 to PGW 120-1. In the instance that S-GW 115-1 cannot accept further reverse IP address registration or does not support reverse IP address registration, AVP handler 410 may not insert the AVP in create session request 505.

PGW—120-1 may receive create session request with AVP 510 and may send an authorization request 515. In one exemplary implementation, PGW 120-1 may send authorization request 515 to AAA server 135-1/HSS 140-1 to determine whether the user is authorized to access the LTE network. In another exemplary implementation, although not illustrated, PGW 120-1 send authorization request 515 to AAA server 135-1/HSS 140-1 via PCRF device 130-1. For example, PCRF device 130-1 may be an intermediary device between PGW 120-1 and AAA 135-1/HSS 140-1. In an exemplary implementation, authorization request 515 may correspond to a Diameter-based AA-request.

It may be assumed that the user is a valid user and AAA server 135-1/HSS 140-1 (and perhaps PCRF device 130-1) may send an authorization response. For example, AVP handler 310 of AAA server 135-1/HSS 140-1 may insert an AVP to indicate that reverse IP address registration may be performed for this user. For example, AAA server 135-1/HSS 140-1 (and perhaps PCRF device 130-1) may make such a determination based on user provisioning in a subscription profile repository (SPR). AAA server 135-1/HSS 140-1 may send an authorization response with AVP 520 to PGW 120-1. For example, authorization response with AVP 520 may correspond to a Diameter-based AA-answer. PGW 120-1 may receive authorization response with AVP 520. In other exemplary implementations, although not illustrated, PCRF device 130-1 may forward authorization response with AVP 520 to PGW 120-1 and/or provide its own authorization response with AVP to PGW 120-1. In still other implementations, authorization response with AVP may traverse MME 125-1 (e.g., when S-GW 115 and PGW 120 may be integrated).

Referring to FIG. 5B, RARD 305 of PGW 120-1 may determine whether reverse IP address registration should be implemented. In an exemplary implementation, RARD 305 may determine, based on create session request with AVP 510, that S-GW 115-1 is capable of providing reverse IP address registration. Additionally, RARD 305 may determine, based on authorization response with AVP 520, that AAA server 135-1/HSS 140-1 authorizes reverse IP address registration. RARD 305 may also determine whether PGW 120-1 is capable of providing reverse IP address registration.

Additionally, in other implementations, RARD 305 may determine whether reverse IP address registration should be implemented based on other types of information. For example, reverse IP address registration may be limited to certain types of media flows (e.g., mobile-to-mobile flows, specific peer-to-peer (P2P) protocol mobile-to-mobile flows, etc.) based on policy settings, subscription settings, etc., associated with this user. The type of media flow may be ascertained based on shallow packet inspection of the 5-tuple (i.e., source IP address, destination IP address, source port, destination port, and protocol) in the IP header. In other implementations, a deep packet inspection (DPI) may be performed, although this may involve a higher degree of resource utilization. As a result, localized media offload may be managed on a per user level, or a finer granularity may be implemented in which localized media offload may be managed on a per user per flow level.

In an exemplary implementation, PCRF device 130 and/or a policy control enforcement point (PCEP) (e.g., implemented in PGW 120-1) may provide RARD 305 with this type of restriction information for reverse IP address registration. For example, PGW 120-1 may send to PCRF device 130 or PCEP a credit control request (CCR) according to the Diameter protocol. An AVP handler of PCRF device 130 or the PCEP may include an AVP in a credit control answer (CCA) to indicate a media flow restriction or some other restriction (e.g., a policy restriction, a subscription-based restriction, etc.) regarding reverse IP address registration. RARD 305 of PGW 120-1 may consider these restrictions when determining whether reverse IP address registration should be implemented.

Additionally, or alternatively, PGW 120-1 may relay these restrictions to S-GW 115-1. For example, AVP handler 310 of PGW 120-1 may insert one or more AVPs in a create session response with AVP.

Regardless of what criteria may be used to determine the possibility and extent of reverse IP address registration, in the instance that RARD 305 determines that reverse IP address registration should be implemented, AVP handler 310 may insert an AVP in a create session response. The create session response may include an IP address assigned to the user. Additionally, the AVP may indicate that this IP address is now reverse registered with S-GW 115-1. For example, as illustrated in FIG. 5B, PGW 120-1 may send a create session response with AVP 530 to S-GW 115-1. S-GW 115-1 may receive create session response with AVP 530. In the instance that RARD 305 determines that reverse IP address registration should not be implemented, a create session response (without an AVP) may be sent to S-GW 115-1.

Upon receipt of create session response with AVP 530, S-GW 115-1 may relay the response to MME 125-1, which may, in turn, send it to UE 105-1 via eNB 110-1, so that UE 105-1 may obtain its assigned IP address. For example, S-GW 115-1 may send a create session response 535 (without the AVP) to MME 125-1. In an exemplary implementation, AVP handler 410 of S-GW 115-1 may detect the AVP and remove the AVP from create session response with AVP 530. Since S-GW 115 may unpack AVPs from packets received from PGW 120-1, and may repack packets to MME 125-1, MME 125-1 may not need additional functionality to interpret create session response 535.

In response to create session response with AVP 530, RARTM 415 of S-GW 115-1 may populate reverse IP address registration table 320 with various parameters based on create session response with AVP 530. For example, RARTM 415 may include the assigned IP address in network address field 325, indicate in breakout field 330 that this IP address is locally broken out, indicate in flow-type field 335 a type of the media flow, and indicate in tunnel ID field 340 wrapper information (e.g., tunnel ID, GTP packet headers, etc.) so that packets of a media flow may reach their destination. As previously mentioned, in other implementations, reverse IP address registration table 320 may include different, additional, and/or fewer informational fields. For example, reverse IP address registration may be restricted in terms of duration (e.g., time-to-live (TTL)) or some other type of parameters, which may be reflected in reverse IP address registration table 320.

In view of the above, reverse IP address registration table 320 may indicate to S-GW 115-1 that this IP address is currently in localized media offload, as well as any other IP addresses previously processed. Additionally, reverse IP address registration table 320 may provide to S-GW 115-1 information to transmit packets in an appropriate protocol wrapping and provide destination user identifier information.

When reverse IP address registration is performed, localized media offload may exist until revocation, modification, disconnection, etc., occurs. For example, if a lawful intercept (e.g., under the Communications Assistance for Law Enforcement Act (CALEA)) is provisioned for this user, PGW 120-1 may revoke localized media offload by embedding an AVP in a modify media request, which may be sent to S-GW 115-1. The AVP may indicate that localized media offload is revoked. Additionally, PGW 120-1 may modify localized media offload with S-GW 115-1 by embedding an AVP in a modify media request to alter a lifetime or duration of the localized media offload, alter the type of media flow that is acceptable to have localized media offload, etc. Alternatively, UE 105-1 may disconnect from the LTE network, which may cause localized media offload to cease.

Absent the cessation of localized media offload, S-GW 115 may have a localized media offload ownership of the IP address assigned to UE 105-1, which was originally owned by PGW 120-1. In this way, the user is reverse-registered on S-GW 115-1 for this connection. Assuming UE 105-2 may be reverse-registered on S-GW 115-1, a media flow between UEs 105-1 and 105-2 may be permitted, as previously illustrated in FIG. 1C, and is further described below.

Figure 5C:
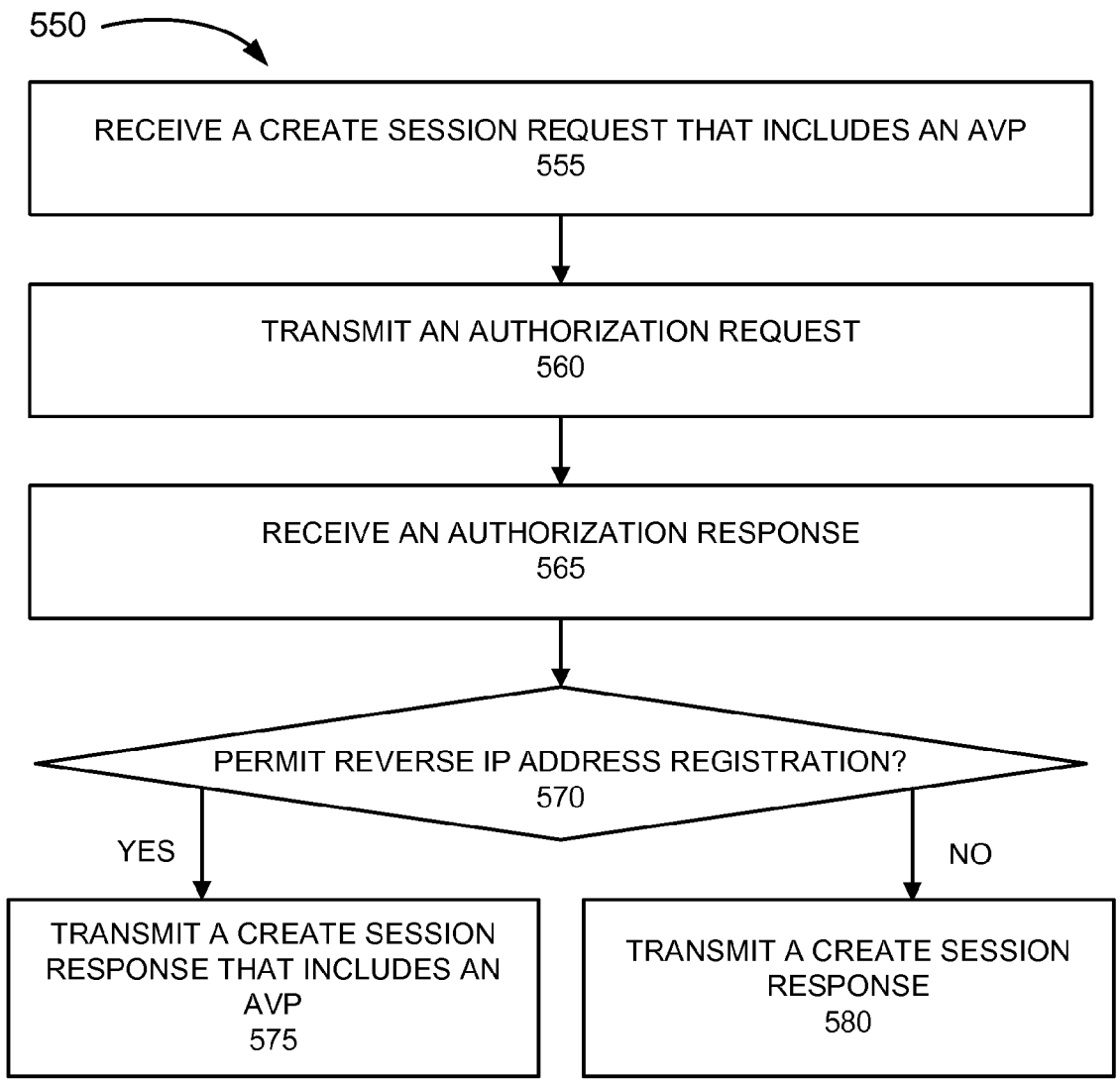
FIG. 5C is a flow diagram illustrating an exemplary process for setting up reverse IP address registration.

FIG. 5C is a flow diagram illustrating an exemplary process 550 for setting up reverse IP address registration. In an exemplary implementation, process 550 may be performed by PGW 120. Process 550 may be applicable to scenarios in which a user may be requesting a PDN connection. For example, the user may be requesting the PDN connection during an initial attachment to the LTE network or the user has previously attached to the LTE network.

Process 550 may include receiving a session request that includes an AVP (block 555). For example, PGW 120 may receive a create session request from S-GW 115. The create session request may include an indication (e.g., an AVP) that S-GW 115 is capable of accepting reverse IP address registration.

An authorization request may be transmitted (block 560). For example, PGW 120 may transmit an authorization request to an authorization device (e.g., AAA server 135, HSS 140, PCRF device 130, or some other authorization device) in response to receiving the create session request.

An authorization response may be received (block 565). For example, PGW 120 may receive an authorization response from the authorization device. The authorization response may include an indication (e.g., an AVP) that reverse IP address registration is authorized.

It may be determined whether reverse IP address registration is permitted (block 570). For example, PGW 120 may determine whether reverse IP address registration is permitted, as previously described. For example, RARD 305 may determine the possibility and extent of reverse IP address registration based on whether PGW 120 has reverse registration capability and whether S-GW 115 has reverse registration capability. Additionally, RARD 305 may determine the possibility and extent of reverse registration based on an authorization device (e.g., AAA server 135, HSS 140, or some other authorization device), policy restrictions, etc., as previously described.

If it is determined that reverse IP address registration is permitted (block 570—YES), a session response that includes an AVP may be transmitted (block 575). For example, PGW 120 may transmit a create session response to S-GW 115-1. The create session response may include an indication (e.g., an AVP) that the IP address is now reverse registered with S-GW 115-1. The create session response may include an assigned IP address.

If it is determined that reverse IP address registration is not permitted (block 570—NO), a session response may be transmitted (block 580). For example, PGW 120 may transmit a create session response to S-GW 115-1. The create session response may include an assigned IP address.

Although FIG. 5C illustrates an exemplary process 550 for setting up a localized media offload, in other implementations, process 550 may include additional operations, fewer operations, and/or different operations than those illustrated in FIG. 5C and described.

Figure 6A:
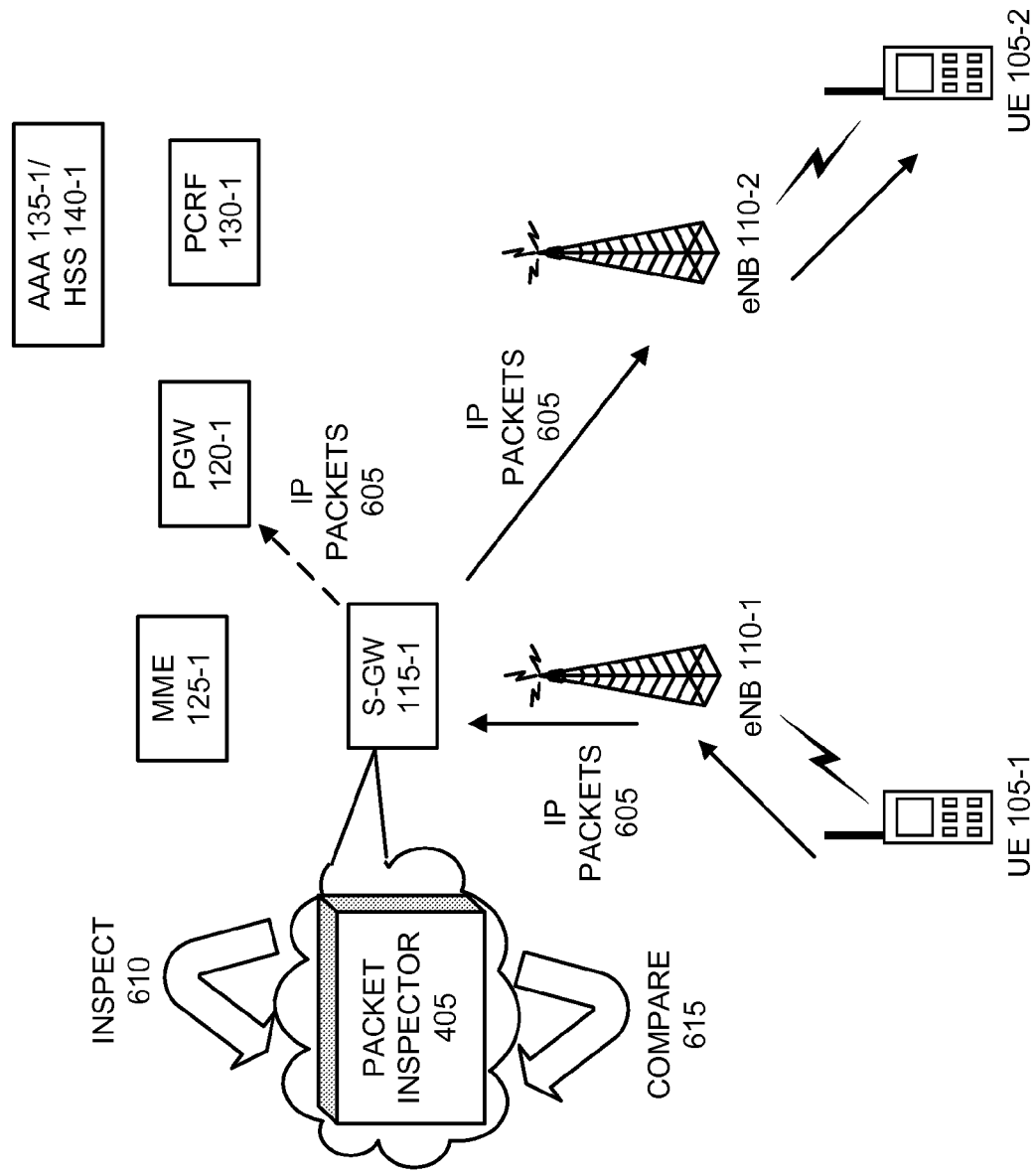
FIG. 6A is a diagram illustrating exemplary processes that may occur in the exemplary environment when performing localized media offload in the S-GW.

Once reverse IP address registration has occurred, S-GW 115 may receive a media flow from UE 105. FIG. 6A is a diagram illustrating exemplary processes that may occur in the exemplary environment when performing localized media offload. In this example, it may be assumed that both UE 105-1 and UE 105-2 are reverse IP address registered with S-GW 115-1.

Assume UE 105-1 transmits IP packets 605 intended for UE 105-2. IP packets 605 may correspond to packets associated with a P2P application. IP packets 605 may be received by S-GW 115-1 via eNB 110-1 (e.g., in a GTP tunnel). S-GW 115-1 may detunnel the media IP packets and packet inspector 405 may inspect 610 IP packets 605 before preparing to retunnel IP packets 605 to a next GTP tunnel toward PGW 120-1. In an exemplary implementation, packet inspector 405 may compare 615 the source IP addresses of IP packets 605 with entries (e.g., network address field 425) of reverse IP address registration table 420 to see if there are matches. If there is no match, S-GW 115-1 may retunnel IP packets 605 towards PGW 120-1 in accordance with LTE communication standards. However, if there are source IP address matches, in an exemplary implementation, packet inspector 405 may compare 615 the destination IP addresses of IP packets 605 with entries (e.g., network address field 425) of reverse IP address registration table 420 to see if there are matches. If the destination IP addresses match, then SGW 115-1 may perform localized media offload with respect to IP packets 605. In such an implementation, symmetric media flows may be provided between the users of UEs 105-1 and 105-2 since both are reverse registered.

In another exemplary implementation, packet inspector 405 may compare 615 only the destination IP addresses with reverse IP address registration table 420 to determine localized media offload. In such an implementation, as long as the destination IP address is reverse-registered, incoming IP packets for that user may be locally broken out at S-GW 115-1. However, there may be instances in which asymmetric media flows may exist between users.

In yet another exemplary implementation, packet inspector 405 may compare 615 only the source IP addresses with reverse IP address registration table 420 to determine localized media offload. In such an implementation, this may permit network traffic, which may be destined to other autonomous systems (ASs) (e.g., not of the same network operator) to be offloaded. However, in such an implementation, S-GW 115-1 may inject routing advertisements for this particular IP address into a routing domain to ensure inbound traffic destined to UE 105 may be received by S-GW 115-1. A further description of these processes will be described in greater detail below.

Returning to a scenario in which source IP addresses and destination IP addresses match, S-GW 115-1 may send IP packets 605 to UE 105-2 via eNB 110-2, instead of PGW 120-1. In this way, the round-trip path between S-GW 115-1 and PGW 120-1 may be avoided. S-GW 115-1 may utilize information in tunnel ID 440 to assist in determining the destination eNB 110. For example, tunnel ID 440 may include the GTP-U tunnel ID (e.g., eNB-SGW GTP tunnel FTEID) associated with the reverse registered IP addresses. In another scenario in which destination IP addresses do not match, S-GW 115-1 may send IP packets 605 to PGW 120-1, as illustrated in FIG. 6A.

RARTM 415 may add, modify, and purge entries in reverse IP address registration table 420 over time. For example, if localized media offload is revoked, the reverse-registered IP address may be purged. Additionally, if a user disconnects from his or her connection, that IP address may be returned to an IP pool managed by PGW 120-1.

Figure 6B:
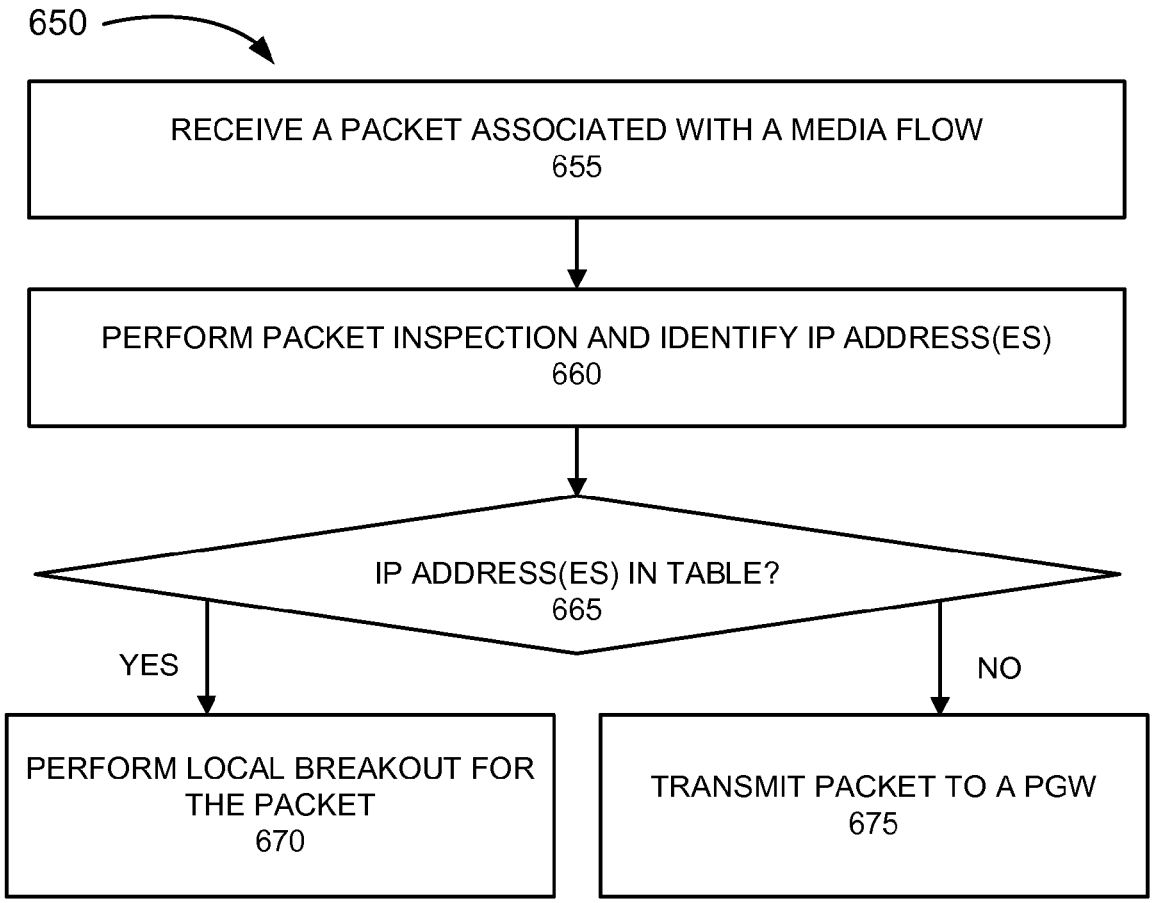
FIG. 6B is a flow diagram illustrating an exemplary process for performing localized media offload in the S-GW.

FIG. 6B is a flow diagram illustrating an exemplary process 650 for performing localized media offload. In an exemplary implementation, process 650 may be performed by S-GW 115. Process 650 may be applicable to scenarios in which a user may be transmitting a media flow to the LTE network Process 650 may include receiving a packet associated with a media flow (block 655). For example, S-GW 115 may receive a packet associated with a media flow from UE 105 via eNB 110.

Packet inspection may be performed and IP address(es) may be identified (block 660). For example, packet inspector 405 of S-GW 115 may inspect the packet received and identify a source IP address, a destination IP address, or both.

It may be determined whether the table includes the IP address(es) identified (block 665). For example, packet inspector 405 may compare the IP address(es) identified to entries in reverse IP address registration table 420. Depending on the embodiment, packet inspector 405 may compare both the source IP address and the destination IP address with entries in reverse IP address registration table 420, or may compare only the source IP address or the destination IP address.

If it is determined that the IP address(es) is or are included in the table (block 665—YES), then localized media offload for the packet may be performed (block 670). For example, as previously described, if packet inspector 405 determines that both the source and destination IP addresses are included in reverse IP registration table 420, S-GW 115 may perform localized media offload for the packet. In the alternative, if packet inspector 405 determines that only the source IP address is included in reverse IP registration table 420, S-GW 115 may perform localized media offload to another AS. In another alternative, if packet inspector 405 determines that only the destination IP address is included in reverse IP registration table 420, S-GW 115 may perform localized media offload.

If it is determined that the IP address(es) is or are not included in the table (block 665—NO), then the packet may be transmitted to a PGW (block 675). For example, as previously described, if packet inspector 405 determines that none of the IP address(es) is or are not included in reverse IP registration table 420, S-GW 115 may not perform localized media offload for the packet. Rather, S-GW 115 may transmit the packet to PGW 120.

Although FIG. 6B illustrates an exemplary process 650 for performing localized media offload, in other implementations, process 650 may include additional operations, fewer operations, and/or different operations than those illustrated in FIG. 6B and described.

Figure 7:
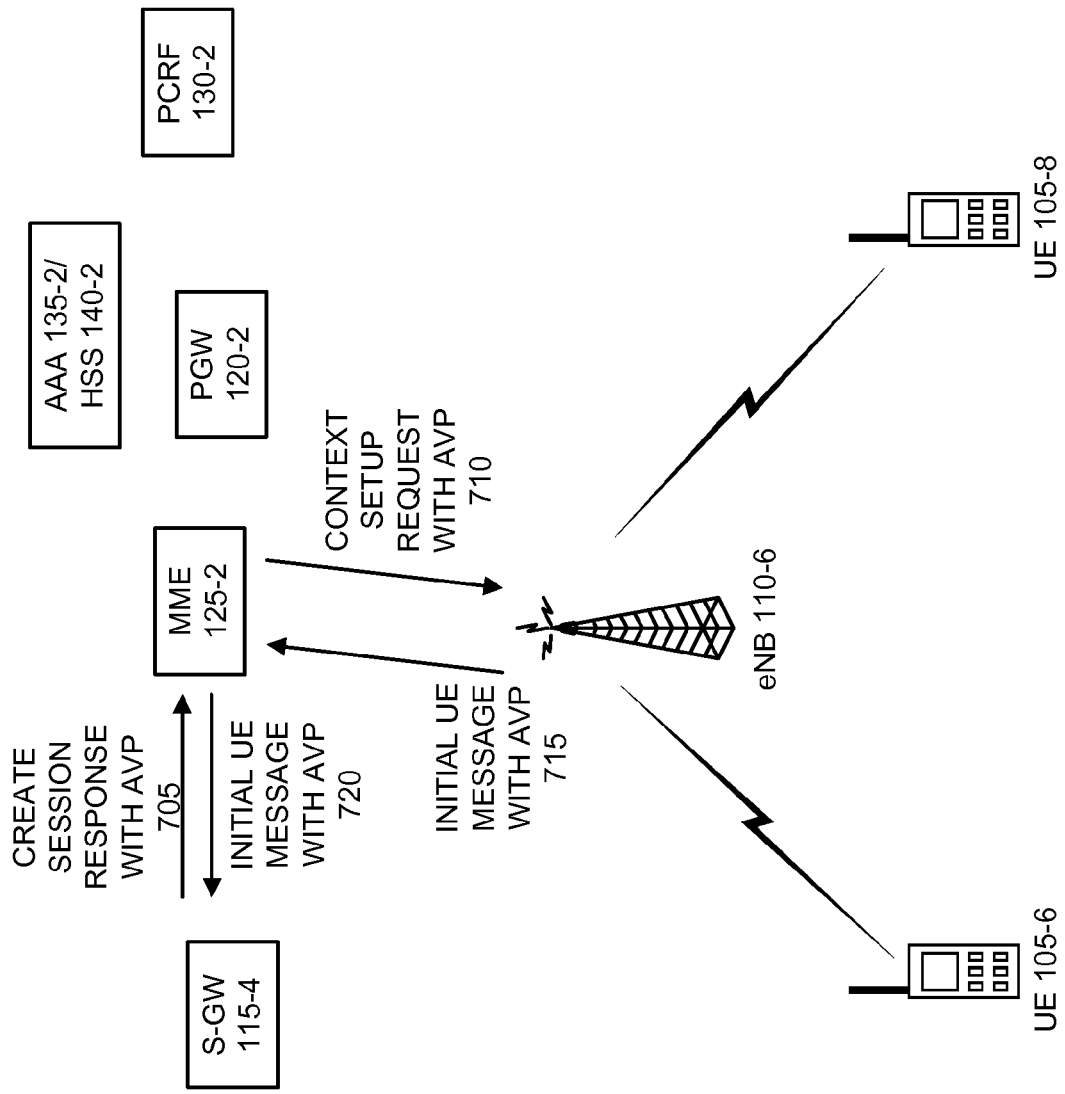
FIG. 7 is a diagram illustrating exemplary messaging that may occur in the exemplary environment when setting up reverse IP address registration with an evolved node-B (eNB)

As previously described, localized media offload may be extended to eNB 110. For example, S-GW 115 may provide for reverse IP address registration with eNB 110. In such instances, as previously described, reverse IP address registration table 420 may include an entry in eNB ID field 440. FIG. 7 is a diagram illustrating exemplary messaging that may occur in environment 100 when setting up reverse IP address registration with eNB 110. The processes described correspond to an exemplary embodiment in which implicit reverse IP address registration may be implemented. In other embodiments, however, explicit reverse IP address registration may be implemented.

Referring to FIG. 7, in an exemplary implementation, when S-GW 115-4 has reverse IP address registration of a particular IP address, media flow, etc., S-GW 115-4 may include an AVP in its create session response to MME 125-2. For example, S-GW 115-4 may transmit a create session response with AVP 705 to MME 125-2. The AVP may indicate that this IP address is now reverse registered with S-GW 115-4. MME 125-2 may include the AVP in an initial context setup request with AVP 710 and transmit initial context setup request with AVP 710 to eNB 110-6.

It may be assumed that eNB 110-6 is capable of providing reverse IP address registration. In such an instance, eNB 110-6 may transmit an AVP in an SLAP initial UE message 715 to MME 125-2, which may be relayed (initial UE message with AVP 720) by MME 125-2 to S-GW 115-4. The AVP may indicate eNB 110-6 is capable of providing reverse IP address registration.

S-GW 115-4 may initiate further reverse IP address registration to eNB 110-6 based on whether eNB 110-6 is capable of accepting reverse IP address registration. Additionally, S-GW 115-4 may consider other criteria (e.g., type of flow, policy settings, etc.), as previously described, to determine whether reverse IP address registration may be extended to eNB 110-6. In the instance that S-GW 115-4 determines that reverse IP address registration to eNB 110-6 should take place, RARTM 415 of S-GW 115-4 may add a corresponding entry in eNB ID field 440 to indicate that eNB 110 has ownership of the IP address. That is, in an exemplary implementation, a master/slave relationship and/or the concatenation or extension of localized media offload may be indicated by the eNB ID field 440. This principle may be further extended when eNB 110 may permit further reverse registration to a home eNB, a UE-GW, etc.

Similar to that previously described with respect to FIG. 6A, and elsewhere in this description, eNB 110-6 may perform packet inspection and consult a reverse IP address registration table 420 when eNB 110-6 receives packets from UE 105-6 or UE 105-8. As previously described, in an exemplary implementation, when both source IP address and destination IP address match entries in reverse IP address registration table 420, localized media offload may take place. In other implementations, localized media offload may take place when only the source IP address or the destination IP address may match entries in reverse IP address registration table 420. In this way, backhaul resources (e.g., cell site to mobile telephone switching office (MTSO), etc.) may be saved, latency may be reduced, etc.

To ensure user mobility, if users move from one eNB 110 to another eNB 110, reverse IP address registration table entries may also move to reflect a user's current point of attachment. For example, referring to FIG. 1A, reverse IP address registration table entries may be exchanged between eNB 110-1 to eNB 110-2 or vice versa. In an exemplary implementation, reverse IP address registration entries may be exchanged over the X2 interface (i.e., logical interfaces between eNBs 110) or over the S1-MME interface, for example, by using MME 125 as an arbitrator of this information exchange between eNBs 110. This same principle may be applied when a user moves from one S-GW 115 to another S-GW 115, in which a reverse IP address registration entry may be transferred (e.g., within handoff messaging). For example, referring to FIG. 1A, reverse IP address registration table entries may be exchanged between S-GW 115-1 to S-GW 115-2 or vice versa.

In instances where user mobility occurs, entries in reverse IP address registration tables associated with higher layers may also be modified. By way of example, but not limited thereto, in an exemplary case where the user moves from eNB 110 to another eNB 110, eNB ID field 440 of reverse IP address registration table 420 may be modified. Additionally, or alternatively, other entries in reverse IP address registration table 420 and/or other entries of reverse IP address registration tables associated with other devices may be modified. In this regard, user mobility may trigger updates to one or more reverse IP address registration tables.

Figure 8:
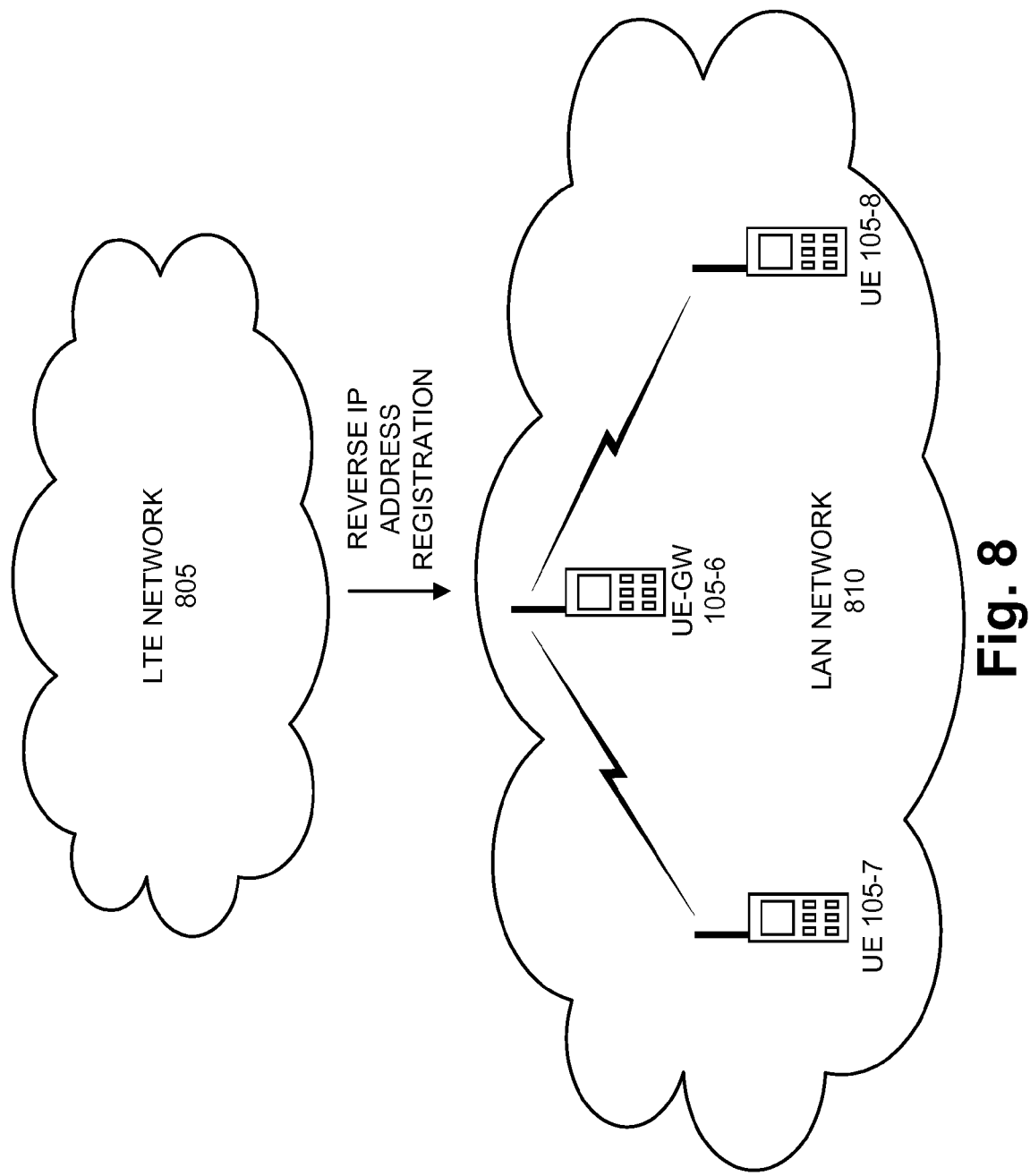
FIG. 8 is a diagram illustrating an exemplary environment that may include an LTE network and a local area network.

As illustrated in FIG. 7, users may be attached to the same eNB 110. However, users may be located in even closer proximity to one another. For example, users may be located within the same picocell, femtocell, etc. In such instances, reverse IP address registration and localized media offload may be extended to a home eNB or to a UE-GW. The UE-GW may include a user device that has gateway functions in which a north-bound interface may have access to the LTE network and a sound-bound interface may have access to any type of network, device, etc. In such instances, for example, multi-user gaming or other types of activity may benefit from reverse IP address registration and localized media offload. An illustration of this type of scenario is depicted in FIG. 8. In such implementations, a reverse IP address registration table similar to that illustrated in FIG. 4B and described herein may be implemented in eNB 110.

FIG. 8 is a diagram illustrating an exemplary environment that may include an LTE network 805 and a local area network (LAN) 810. Although not illustrated, LTE network 805 may include one or more eNBs 110, S-GWs 115, PGWs 120, etc.

In an exemplary implementation, assume that UEs 105-7 and 105-8 are situated in a residential/enterprise environment and that UE-GW 105-6 may operate as an LTE wireless network gateway to which UEs 105-7 and 105-8 may be attached. In such an instance, it may be assumed that UE-GW 105-6 may establish multiple, simultaneous IP connections in which each IP connection may have a distinct user-level IP address. For example, UEs 105-7 and 105-8 may each have separate IP connections to LTE network 805 via UE-GW 105-6. In other words, each of these IP connections may be used for a separate logical or physical node on the LAN-side of UE-GW 105-6. In other implementations, UE-GW may use two different access technologies on the north-bound and south-bound interfaces.

Extending reverse IP address registration and localized media offload functionality to UE-GW 105-6 may enable the UE function (embedded in the LTE wireless network gateway) to locally breakout packets between UEs 105-7 and 105-8 without even transmitting these packets on the wide area network (WAN)-LTE network side of UE-GW 105-6. In such an implementation, intelligent traffic management may conserve usage of resources associated with LTE network 805. As such, this may exemplify a possible extension of localized media offload based on reverse IP address registration.

When localized media offloading occurs from PGW 120 to another device (e.g., S-GW 115, eNB 110, etc.), these devices may include event reporting functions (ERFs). The ERF may report changes in media flow requirements (e.g., bandwidth, quality of service (QOS), etc.). In such implementations, ERF information may be reported to PCRF device 130 or AAA server 135 directly or via S-GW 115 and/or PGW 120. It will be appreciated that when the PMIP is used, S-GW 115 may include a bearer binding and ERF (BBERF); however, when the GTP may be used, typically S-GW 115 may not include the ERF. Thus, in an exemplary implementation, when S-GW 115 utilizes the GTP, an ERF may be added to S-GW 115. Additionally, eNB 110, home eNB, UE-GW, etc., may include ERFs for reporting directly to PCRF device 130 or AAA server 135 or via S-GW 115 and/or PGW 120. Additionally, in an exemplary implementation, S-GW 115, eNB 110, etc. may meter all packets during localized media offloading, and may pass this metering information to PCRF 130 or AAA server 135. In this way, the network operator or service provider may be aware of the extent of the localized media offloading on a per-user or per user per flow basis. The network operator or service provider may utilize the metering data for differential charging purposes, etc., and for roaming as needed.

As previously described, when network traffic may be destined to other ASs, S-GW 115 may inject routing advertisements into a routing domain to ensure inbound traffic destined to UE 105 may be received by S-GW 115. Typically, an IP pool may be advertised by PGW 120 using a routing protocol to the routing domain. Under this framework, inbound traffic destined for any of those IP address may be transmitted to PGW 120. However, in the case when a particular IP address is reverse-registered by PGW 120 to S-GW 115, PGW 120 may withdraw the routing advertisement for a particular IP address from the routing domain, and S-GW 115 may inject a routing advertisement for the particular IP address into the routing domain. In such an implementation, this may ensure that inbound traffic destined to that particular IP address may now be directed toward S-GW 115. This concept may be further extended to eNB 110, etc. An advantage to this approach may be that now, by means of standard IP routing, all inbound traffic (i.e., regardless of source) destined for the reverse-registered IP address may be routed toward S-GW 115, eNB 110, or some other node, without necessarily being routed first to PGW 120. This may include Internet push traffic, traffic sourced from other ASs, etc. In such an implementation, traffic traversing PGW 120 may be significantly reduced. It will be appreciated, however, that such an implementation may increase a volume and/or frequency of routing advertisements related to IP addresses in the routing domain. Further, an additional burden may be placed on routing elements to manage routing protocol reconvergence and routing domain stability.

Figure 9A:
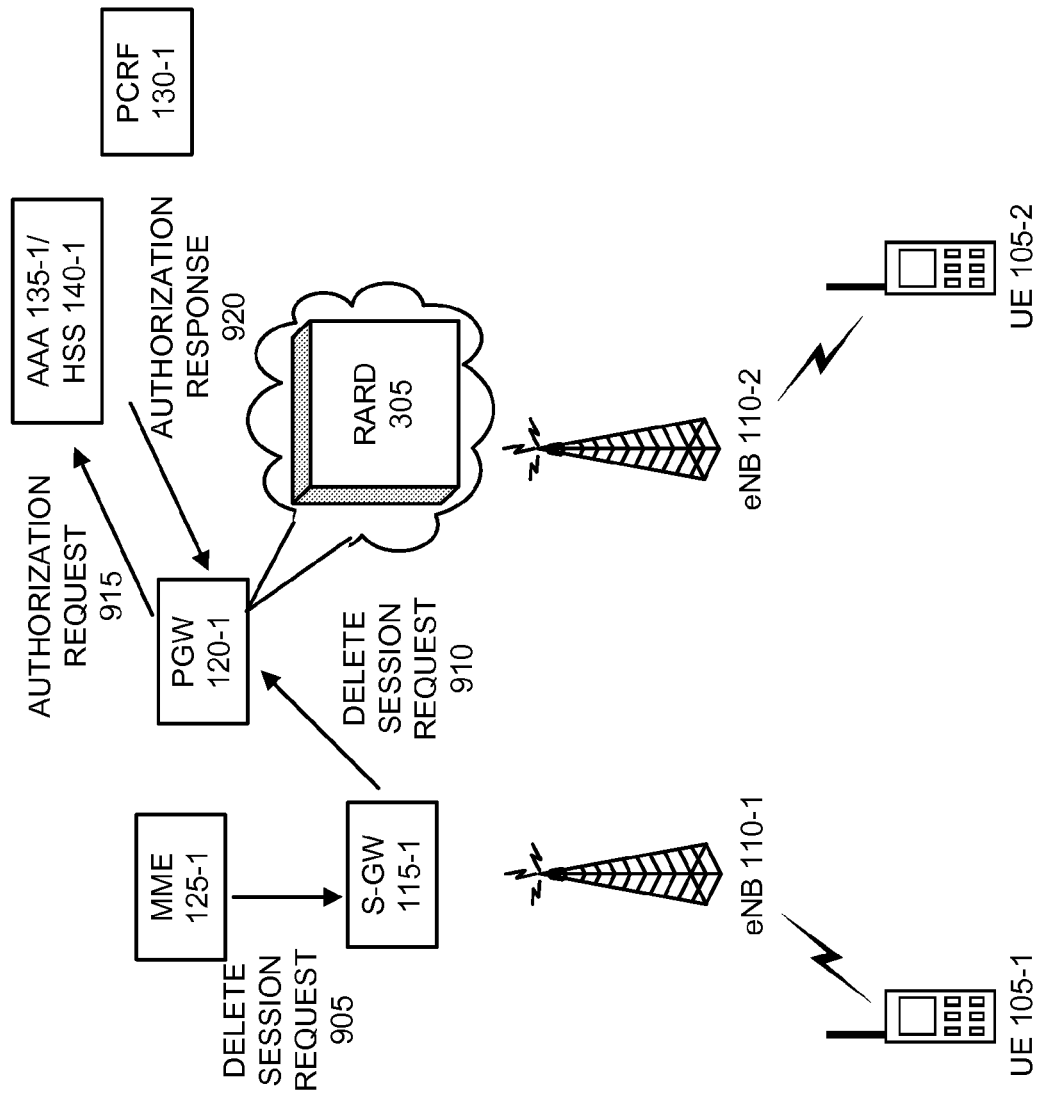
FIGS. 9A and 9B are diagrams illustrating exemplary messaging to purge a reverse IP address registration entry after disconnection.
Figure 9B:
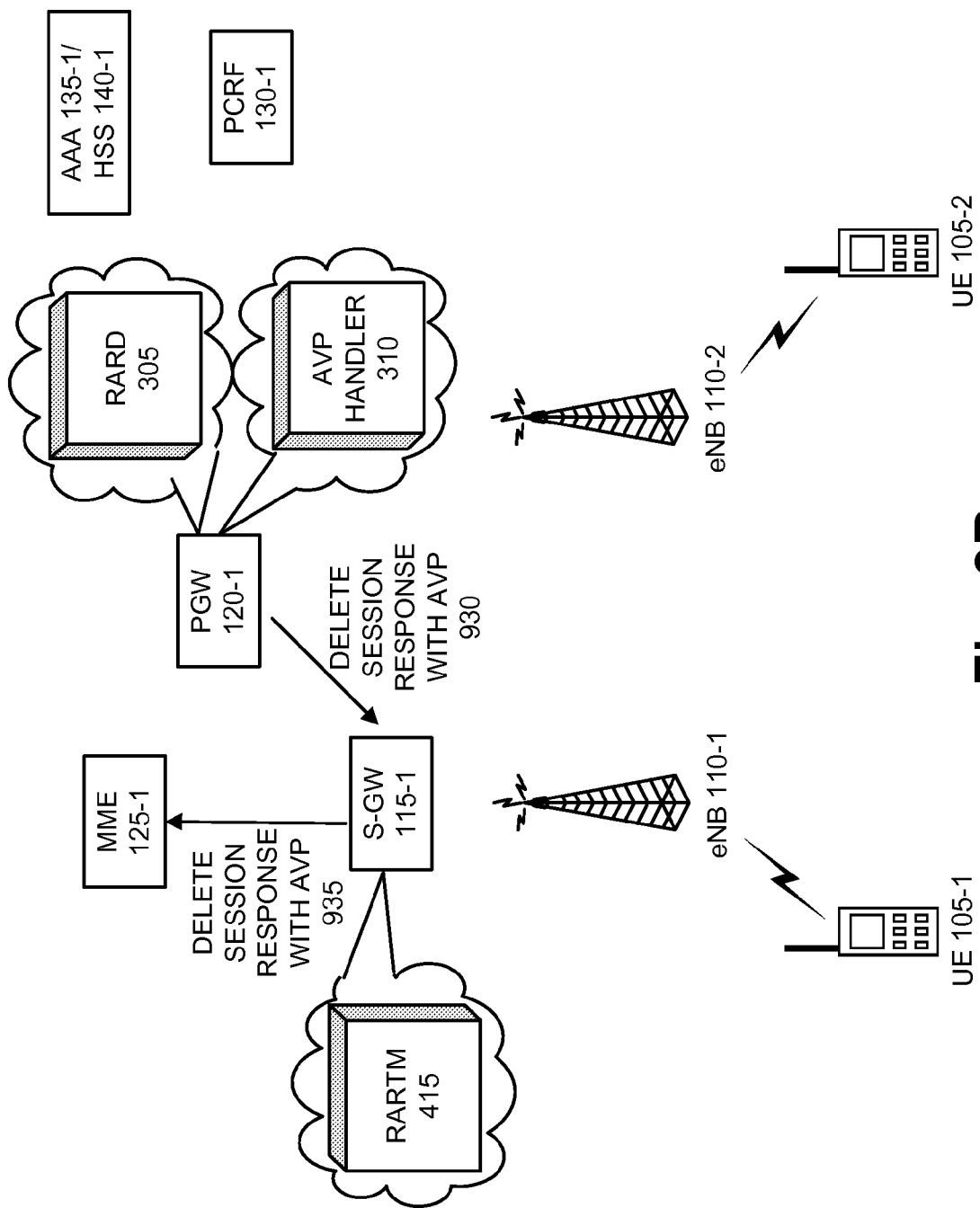

FIGS. 9A and 9B are diagrams illustrating exemplary messaging to purge a reverse IP address registration entry after disconnection. The process described corresponds to an exemplary embodiment in which purging may be implemented implicitly. In other embodiments, purging may be implemented explicitly (e.g., new messages).

Referring to FIG. 9A, assume UE 105-1 detaches from the LTE network (i.e., disconnects from a connection), or transmits, for example, a PDN disconnection request for a particular connection. The PDN disconnection request may correspond to a non-access stratum (NAS) message and sent transparently by UE 105-1 to MME 125-1. Upon receipt of the NAS message, MME 125-1 may transmit a delete session request 905 to S-GW 115-1. S-GW 115-1 may relay a delete session request 910 to PGW 120-1.

When PGW 120-1 receives delete session request 910, PGW 120-1 may transmit an authorization request 915 (e.g., a Diameter-based AA-request) to AAA server 135-1/HSS 140-1 (or via PCRF device 130-1). AAA server 135-1/HSS 140-1 may transmit an authorization response 920 (e.g., a Diameter-based AA-answer) to PGW 120-1.

Referring to FIG. 9B, in an exemplary implementation, when PGW 120-1 receives authorization response 920, RARD 305 of PGW 120-1 may determine if the IP (PDN) connection corresponds to a reverse-registered IP address. If so, AVP handler 310 may include an AVP in a delete session response with AVP 930. The AVP may indicate to S-GW 115-1 to purge reverse IP address registration table 420 of all entries corresponding to the particular IP address(es) and/or media flows associated with the user of UE 105-1. In another exemplary implementation, PGW 120-1 may insert the AVP based on a presence of an AVP in authorization response 920.

When S-GW 115-1 receives delete session response with AVP 930, RARTM 415 of S-GW 115-1 may purge all entries in reverse IP address registration table 420 associated with the particular IP address(es) and/or media flows corresponding to the user of UE 105-1. In the instance that the user has been reverse-registered with eNB 110-1 (i.e., no longer reverse-registered with S-GW 115-1), in an exemplary implementation, S-GW 115-1 may relay the AVP to MME 125-1 (e.g., in delete session response with AVP 935) and may inform MME 125-1 to inform the particular eNB 110 (i.e., eNB 110-1) to purge entries in reverse IP address registration table 420 associated with the particular IP address(es) and/or media flows corresponding to the user of UE 105-1. Although not illustrated, in an exemplary implementation, MME 125-1 may convey this information to eNB 110-1 as a part of a EUTRAN-radio access media (E-RAB) release command. Similar approaches may be used for LTE network-initiated detachment and PCRF-initiated IP-Connectivity Access Network (CAN) session termination. Further, similar approaches may be used with inter-S-GW 115 mobility and inter-eNB 110 mobility to ensure that current S-GW 115 or current eNB 110 maintains entries in a reverse IP address registration table for the user, and any previous SGW 115 or previous eNB 110 may purge entries in reverse IP address registration table associated with the user.

Online/offline charging enforcement function may be implemented in PGW 120. If localized media offload is performed either by S-GW 115, eNB 110, etc., the network traffic from one UE 105 to another UE 105 may bypass PGW 120. As a result, PGW 120 may not be in the media flow path for all network traffic and therefore may not be able to perform charging enforcement, counting of bytes, etc. If the network operator's policy is to charge transparently, even after localized media offload, additional functionality (e.g., inband or out-of-band messaging) may be needed in S-GW 115, eNB 110, etc., to, for example, count packets according to policy, which may be offloaded locally, and report this upward to the master in out-of-band messaging or embedded, additional AVPs in existing LTE messaging.

In an exemplary implementation, policy enforcement may be performed by a PCEP, which may be implemented in PGW 120 for an LTE EPC using GTP-based S5/S8 interfaces. Similar to that described above, when localized media offload occurs, packets may not traverse PGW 120 (and PCEP). In such cases, media flow-specific localized media offload (e.g., restriction to localized media offload based on media flow type), as previously described, rather than all media flows between users, may be implemented. In such an implementation, each media flow that may require policy enforcement may still pass through PGW 120 (and PCEP).

In instances of lawful intercept (e.g., under the CALEA), when a lawful intercept is provisioned prior to the user obtaining localized media offload, PGW 120 may deny reverse IP address registration to S-GW 115, etc., when the user requests attachment. In situations when localized media offload is occurring, and lawful intercept is required, PGW 120 may revoke the localized media offload, as described herein.

In one or more embodiments described herein, an initiator of reverse IP address registration may be, by default, originating from PGW 120, since PGW 120 typically has ownership of the IP pool. Thus, in such instances, PGW 120 may have initial offload ownership for each IP address (i.e., when the IP address may be first assigned to a user). As described, reverse IP address registration may be chained (e.g., PGW 120 may permit localized media offload to S-GW 115, S-GW 115 may permit localized media offload to eNB 110, etc.) in which a master (e.g., PGW 120) may permit temporary ownership to a slave (e.g., S-GW 115) of an IP address, a media flow, etc. The master may, at any time, revoke the localized media offload and re-assume ownership of the IP address. Further, a revocation may also cascade through a chain of localized media offloads (e.g., from eNB 110 to S-GW 115 and from S-GW 115 to P-GW 120). For example, if PGW 120 decides to revoke a localized media offload to S-GW 115, and S-GW 115 has already provided for localized media offload to eNB 110, then S-GW 115, upon receipt of the revocation, may revoke any further downstream offloading.

One or more embodiments may be implemented with no change to existing signaling/messaging (e.g., implicit reverse IP address registration for localized media offload may be retrofitted to work on a standards-compliant LTE implementation), but with an addition of minimal AVPs to existing signaling/messaging.

Additionally, one or more embodiments may be implemented such that when the source and sink of network traffic reside in the same AS, no IP routing/advertisement changes in the routing domain are needed. Additionally, one or more embodiments may provide for S-GW 115, eNB 110, etc., to do protocol conversion and add appropriate identifier information for the converted protocol while locally breaking out packets so the packets may reach the appropriate destination. For example, S-GW 115 may use tunnel ID field 440 of reverse IP address registration table 420 to add FTEID information to construct tunneling packets (e.g., GTP-U packets). S-GW 115 may use these constructed packets to wrap IP packets. In such an implementation, the packets may arrive at the appropriate destination eNB 110 and arrive at the appropriate UE 105. This principle may be further extended to eNB 110 in which, for example, a Cell Radio Network Temporary Identifier (CRNTI) may be added to an LTE-Uu interface packets. eNB 110 may use these packets to wrap IP packets. In such an implementation, the packets may arrive at the appropriate user and may be transparent to the user.

The foregoing description of implementations provides illustration, but is not intended to be exhaustive or to limit the implementations to the precise form disclosed. Accordingly, modifications to the implementations described herein may be possible. For example, new messages may be created and relayed between network devices of the LTE network to exchange information similar to the information associated with the AVPs.

Additionally, although this description includes one or more embodiments related to the LTE network, as previously described, localized media offloading may be implemented in other types of networks.

The term "wireless station," is intended to be broadly interpreted to include a device that wirelessly communicates with user devices (or UEs). By way of example, but not limited thereto, a wireless station may correspond to an eNB, a base station, a Node B, a base transceiver station (BTS), a relay node, a repeater, a home eNB, or a UE-GW. Additionally, the term "layer 2 termination point," as used herein is intended to be broadly interpreted to include a device that is a point of termination of layer 2 services/functions. By way of example, but not limited thereto, a layer 2 termination point may correspond to an S-GW or a radio network controller (RNC). Additionally, the layer 2 termination point may be implemented to support more than one access technologies. Additionally, the term "IP anchor point," as used herein is intended to be broadly interpreted to include a device that may provide a constant presence with a static IP address for a user device. By way of example, but not limited thereto, an IP anchor point may correspond to a PGW, a gateway GPRS Support Node (GGSN), or a home agent.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5C and 6B, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" that performs one or more functions. This logic may include hardware, such as one or more processors, one or more microprocessors, one or more ASICs, one or more FPGAs, etc., software, or a combination of hardware and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
    receiving, by an Internet Protocol (IP) anchor point, a session request to a network originating from a user equipment (UE);
    assigning, by the IP anchor point, an IP address to the UE;
    determining, by the IP anchor point, whether a reverse IP address registration is permitted to a first network device that is in closer proximity to the UE than the IP anchor point, wherein the reverse IP address registration permits a media flow associated with the IP address and the UE to traverse the first network device and omit traversing the IP anchor point; and
    assigning, by the IP anchor point, an ownership of the IP address to the first network device when the reverse IP address registration is permitted.

2. The method of claim 1, wherein the first network device comprises a serving gateway (S-GW) and the IP anchor point comprises a packet data network gateway (PGW).

3. The method of claim 2, wherein the determining comprises:
    determining whether the S-GW supports the reverse IP address registration; and
    assigning the ownership of the IP address to the S-GW when the S-GW supports the reverse IP address registration.

4. The method of claim 2, further comprising:
    receiving, by the S-GW, the media flow;
    determining whether the IP address associated with the media flow is reverse IP address registered; and
    omitting to pass the media flow to the PGW when the IP address is reverse IP address registered with the S-GW.

5. The method of claim 4, wherein the IP address corresponds to at least one of a source IP address or a destination IP address associated with the media flow.

6. The method of claim 2, further comprising:
    determining, by the S-GW, whether reverse IP address registration is permitted to an evolved node B (eNB); and
    assigning an ownership of the IP address to the eNB when reverse IP address registration is permitted.

7. The method of claim 6, further comprising:
    receiving, by the eNB, the media flow;
    determining whether the IP address associated with the media flow is reverse IP address registered; and
    omitting to pass the media flow to the S-GW when the IP address is reverse IP address registered with the eNB.

8. The method of claim 2, further comprising:
    revoking, by the PGW, the ownership of the IP address when a lawful intercept request is received.

9. The method of claim 2, further comprising:
    exchanging the ownership of the IP address between the S-GW and another S-GW based on mobility of the UE.

10. The method of claim 2, wherein the determining comprises:
    determining a type of media flow associated with the session request; and
    assigning the ownership of the IP address to the S-GW when the type of media flow is authorized for the reverse IP address registration.

11. A network device comprising:
    one or more memories to store instructions; and
    one or more processors to execute the instructions in the one or more memories to:
    receive a session request to access a network from a user equipment (UE);
    assign an Internet Protocol (IP) address to the UE;

determine whether a reverse IP address registration is permitted to a first network device that is in closer proximity to the UE than the network device, wherein the reverse IP address registration permits a media flow associated with the IP address and the UE to traverse the first network device and omit traversing the network device; and assign an ownership of the IP address to the first network device when the reverse IP address registration is permitted.

12. The network device of claim 11, wherein the network device comprises an IP anchor point and the first network device comprises a layer two termination point.

13. The network device of claim 11, wherein, when determining, the one or more processors are to execute the instructions to:
determine, on a user level or a user per media flow level, whether the reverse IP address registration is authorized on a user level or a user per media flow level.

14. A network system comprising:
a Long Term Evolution (LTE)-based packet data network gateway (PGW) comprising:
  one or more first communication interfaces;
  one or more first memories to store instructions; and
  one or more first processors to execute the instructions in the one or more first memories; and
an LTE-based serving gateway (S-GW) comprising:
  one or more second communication interfaces;
  one or more second memories to store instructions; and
  one or more second processors to execute the instructions in the one or more second memories, wherein the one or more first processors of the PGW execute the instructions to:
    receive, via one of the one or more first communication interfaces, a session request to access the network system from a user equipment (UE);
    assign an Internet Protocol (IP) address to the UE;
    determine whether a reverse IP address registration is permitted to the S-GW, wherein the reverse IP address registration permits a media flow associated with the IP address and the UE to traverse the S-GW and omit traversing the PGW; and
    assign an ownership of the IP address to the S-GW when the reverse IP address registration is permitted.

15. The network system of claim 14, wherein the one or more second processors of the S-GW execute the instructions to:
generate a reverse IP address registration table and include an entry indicating the ownership of the IP address;
receive, via one of the one or more second communication interfaces, the media flow originating from the UE;
consult the reverse IP address registration table to determine whether the IP address associated with the media flow is reverse IP address registered; and
omit to pass the media flow to the PGW when the entry indicates the ownership of the IP address.

16. The network system of claim 15, wherein the one or more second processors of the S-GW execute the instructions to:
perform packet inspection associated with the media flow to determine whether at least one of a source IP address or a destination IP address of the media flow is found in the reverse IP address registration table; and
wherein if both the source IP address and the destination IP address are found in the reverse IP address registration table, the media flow is passed to an evolved node B (eNB) to which a destination UE is attached.

17. The network system of claim 14, wherein the one or more second processors of the S-GW execute the instructions to:
determine whether an evolved node B (eNB) supports reverse IP address registration; and
assign the ownership of the IP address to the eNB when the eNB supports the reverse IP address registration.

18. The network system of claim 17, further comprising the eNB, the eNB comprising:
one or more third communication interfaces;
one or more third memories to store instructions; and
one or more third processors to execute the instructions in the one or more third memories, wherein the one or more third processors of the eNB execute the instructions to:
  receive, via one of the one or more third communication interfaces, the media flow;
  determine whether the IP address associated with the media flow is reverse IP address registered; and
  omit to pass the media flow to the S-GW when the IP address is reverse IP address registered with the eNB.

19. The network system of claim 18, wherein the one or more third processors of the eNB execute the instructions to:
determine whether a home eNB supports reverse IP address registration; and
assign the ownership of the IP address to the home eNB when the home eNB supports the reverse IP address registration.

20. The network system of claim 18, wherein the one or more third processors of the eNB execute the instructions to:
store a reverse IP address registration table that includes one or more entries associated with one or more IP addresses that are reverse IP address registered; and
exchange one of the one or more entries and ownership of the IP address with another eNB based on mobility of the UE associated with a user.

* * * * *